(12) United States Patent
Yeh et al.

(10) Patent No.: US 9,274,706 B2
(45) Date of Patent: Mar. 1, 2016

(54) DATA MANAGEMENT METHOD, MEMORY CONTROL CIRCUIT UNIT AND MEMORY STORAGE APPARATUS

(71) Applicant: PHISON ELECTRONICS CORP., Miaoli (TW)

(72) Inventors: Chih-Kang Yeh, Kinmen County (TW); Chang-Guang Lin, Miaoli (TW); Chun-Jung Lee, Miaoli (TW)

(73) Assignee: PHISON ELECTRONICS CORP., Miaoli (TW)

( * ) Notice: Subject to any disclaimer, the term of this patent is extended or adjusted under 35 U.S.C. 154(b) by 28 days.

(21) Appl. No.: 14/468,342

(22) Filed: Aug. 26, 2014

(65) Prior Publication Data

US 2016/0011785 A1    Jan. 14, 2016

(30) Foreign Application Priority Data

Jul. 10, 2014    (TW) .............................. 103123835 A

(51) Int. Cl.
*G06F 12/02*    (2006.01)
*G06F 3/06*    (2006.01)

(52) U.S. Cl.
CPC ............ *G06F 3/0608* (2013.01); *G06F 3/0619* (2013.01); *G06F 3/0655* (2013.01); *G06F 3/0679* (2013.01)

(58) Field of Classification Search
CPC ... G06F 3/0608; G06F 3/0619; G06F 3/0655; G06F 3/0679
USPC ................. 711/103, 154, 156, 165, 170, 202; 365/185.33; 707/693; 710/68; 714/773
See application file for complete search history.

(56) References Cited

U.S. PATENT DOCUMENTS

| | | | | |
|---|---|---|---|---|
| 8,364,929 B2* | 1/2013 | Haines | ................ | G06F 12/0246 711/103 |
| 8,706,953 B2* | 4/2014 | Cho | ........................ | H03M 7/30 711/103 |
| 8,725,933 B2* | 5/2014 | Khan | ................... | G06F 12/0246 711/103 |
| 8,806,108 B2* | 8/2014 | Suzuki | .................. | G06F 3/0608 365/185.33 |
| 8,862,837 B1* | 10/2014 | Marshak | ................. | G06F 12/00 711/154 |
| 8,949,513 B2* | 2/2015 | Huang | .................. | G06F 3/0608 707/693 |
| 8,949,517 B2* | 2/2015 | Cohen | .................... | G11C 16/06 711/103 |
| 8,996,807 B2* | 3/2015 | Joshi | ................... | G06F 9/45558 711/100 |
| 9,003,104 B2* | 4/2015 | Joshi | ................... | G06F 12/0886 711/100 |
| 2011/0320915 A1* | 12/2011 | Khan | .................... | G06F 3/0608 714/773 |
| 2012/0272123 A1* | 10/2012 | Yeh | ...................... | G06F 12/0246 714/773 |
| 2012/0290798 A1* | 11/2012 | Huang | .................. | G06F 3/0608 711/154 |
| 2013/0179659 A1* | 7/2013 | Seo | ........................ | G06F 12/023 711/170 |
| 2013/0297894 A1* | 11/2013 | Cohen | .................... | G06F 3/0679 711/154 |
| 2014/0006745 A1* | 1/2014 | Fontenot | ................. | G06F 12/04 711/170 |

(Continued)

*Primary Examiner* — Stephen Elmore
(74) *Attorney, Agent, or Firm* — Jianq Chyun IP Office

(57) ABSTRACT

A data management method is provided. The method includes: dividing each of physical programming units into a data bits area and a spare bits area; generating first data management information corresponding to first data according to a first write command and the first data; determining whether the first data is compressible; and generating first data compression information corresponding to the first data. The method further includes: if the first data is compressible, compressing the first data to generate first compressed data, programming the first compressed data and the first data management information corresponding to the first data into a first data bits area of a first physical programming unit among the physical programming units, and programming the first data compression information into the first spare bits area of the first physical programming unit.

24 Claims, 14 Drawing Sheets

(56) References Cited

U.S. PATENT DOCUMENTS

| | | | |
|---|---|---|---|
| 2014/0059278 A1* | 2/2014 | Schuh | G06F 12/0246 711/103 |
| 2014/0101379 A1* | 4/2014 | Tomlin | G06F 3/0608 711/103 |
| 2014/0108703 A1* | 4/2014 | Cohen | G06F 3/0616 711/103 |
| 2014/0208007 A1* | 7/2014 | Cohen | G06F 3/0608 711/103 |
| 2014/0250257 A1* | 9/2014 | Khan | G11C 16/10 711/103 |
| 2014/0281155 A1* | 9/2014 | Cohen | G06F 3/0619 711/103 |
| 2014/0281167 A1* | 9/2014 | Danilak | G06F 3/0688 711/103 |
| 2015/0095553 A1* | 4/2015 | Walls | G06F 3/0613 711/103 |
| 2015/0242122 A1* | 8/2015 | Yeh | G06F 3/061 711/103 |

* cited by examiner

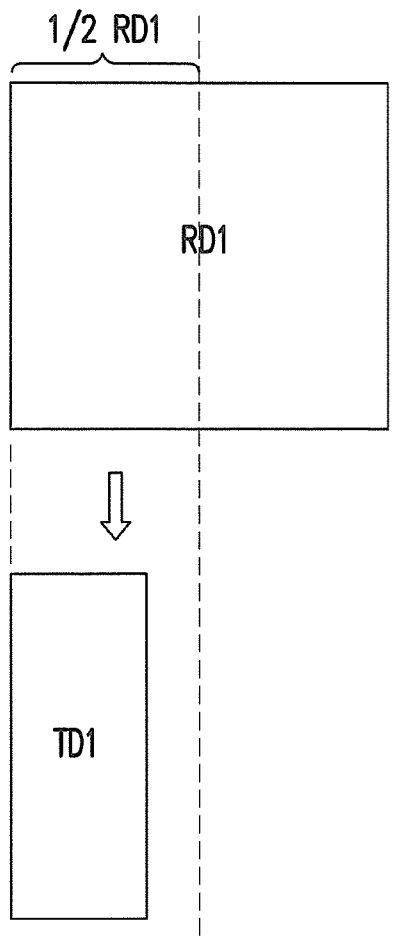
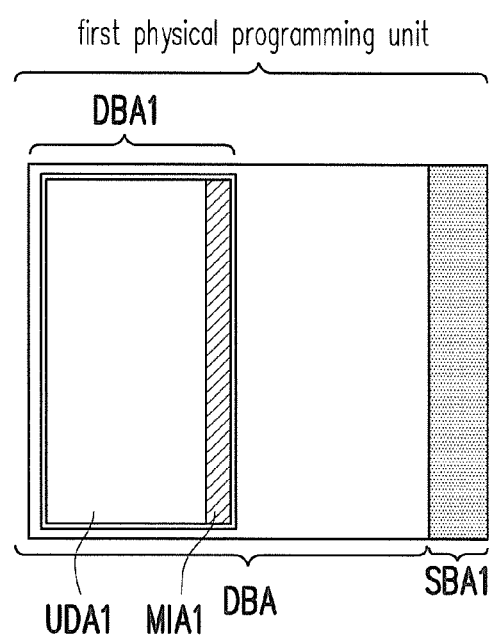
FIG. 12A
FIG. 12B

DATA MANAGEMENT METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 103123835, filed on Jul. 10, 2014. The entirety of the above-mentioned patent application is hereby incorporated by reference herein and made a part of this specification.

BACKGROUND

1. Technical Field

The present invention relates to a data management method, and a memory control circuit unit and a memory storage apparatus using the same.

2. Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a storage apparatus which utilizes a flash memory as its storage medium. For these reasons, the flash memory has become an import part of the electronic industries.

In an example where a control circuit of a flash memory storage apparatus supports compression functions (i.e., functions that compress data stored by a host system and writes the compressed data into a flash memory), if data management information corresponding to the compressed data is also stored into a spare bits area of a physical programming unit already stored with that compressed data, a space of the spare bits area of the physical programming unit stored with the compressed data is reduced accordingly. This reduces a space for storing an error checking and correcting code, and thereby sacrifices an error checking and correcting capability. Therefore, how to effectively manage related information for compressing data has become one of the major subjects for person skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data management method, and a memory control circuit unit and a memory storage apparatus using the same, and capable of effectively managing information for compressing data in order to increase a use efficiency of the space in the memory.

An exemplary example of the present invention provides a data management method for a rewritable non-volatile memory module, wherein the rewritable non-volatile memory module includes a plurality of physical erasing units and a plurality of logical units for mapping to at least a part of the physical erasing units, and each of the physical erasing units includes a plurality of physical programming units. The data management method includes: dividing each of physical programming units into a data bits area and a spare bits area, receiving a first write command and first data corresponding to the first write command, and generating first data management information corresponding to the first data according to the first write command and the first data. The data management method also includes: determining whether the first data is compressible, and generating first data compression information corresponding to the first data according to a determination result. The data management method further includes: if the first data is compressible, compressing the first data to generate first compressed data, programming the first compressed data and the first data management information corresponding to the first data into a first data bits area of a first physical programming unit among the physical programming units, and programming the first data compression information into a first spare bits area of the first physical programming unit; and if the first data is incompressible, programming the first data into the first data bits area of the first physical programming unit, and programming the first data compression information and the first data management information into the first spare bits area of the first physical programming unit.

An exemplary example of the present invention provides a data management method for a rewritable non-volatile memory module, wherein the rewritable non-volatile memory module includes a plurality of physical erasing units, and a plurality of logical units for mapping to at least a part of the physical erasing units, and each of the physical erasing units includes a plurality of physical programming units. The data management method includes: at least dividing each of the physical programming units into a data bits area and a spare bits area. The data management method includes: receiving a first data which is compressible, and compressing the first data into first compressed data, and generating first data compression information corresponding to the first data, wherein information indicating whether the first data is compressed and a compression rate corresponding to the first data are integrated into the first data compression information. The data management method also includes: dividing a first data bits area of a first physical programming unit among the physical programming units into a first user data area and a first management information area, and programming the first compressed data into the first user data area. The data management method further includes: programming first data management information corresponding to the first data into the first management information area, and programming the first data compression information into the first spare bits area of the first physical programming unit.

An exemplary embodiment of the present invention provides a memory control circuit unit configured to control a rewritable non-volatile memory module. The memory control circuit unit includes: a host interface, a memory interface, a memory management circuit and a data compressing/decompressing circuit. The host interface is configured to couple to a host system. The memory interface is configured to couple to the rewritable non-volatile memory module, wherein the rewritable non-volatile memory module includes a plurality of physical erasing units, and each of the physical erasing units includes a plurality of physical programming units. The memory management circuit is coupled to the host interface and the memory interface, and configures a plurality of logical units for mapping to at least a part of the physical erasing units. The data compressing/decompressing circuit is coupled to the memory management circuit, and configured to perform a compressing operation or a decompressing operation on data. The memory management circuit is configured to divide each of the physical programming units into a data bits area and a spare bits area. The memory management circuit is further configured to receive a first write command and first data corresponding to the first write command, and generate first data management information corresponding to the first data according to the first write command and the first data. Further, the memory management circuit is further configured to determine whether the first data is compressible, and generate first data compression information corresponding to the first data according to a determination result. If the first data is compressible, the memory management circuit is further configured to instruct the data compressing/decompressing circuit to compress the first data to generate first compressed data, and the memory management circuit is further configured to issue a command sequence to the rewritable non-volatile memory module in order to program the first compressed data and the first data management information corresponding to the first data into a first data bits area of a first physical programming unit among the physical programming units, and program the first data compression information into the first spare bits area of the first physical programming unit. If the first data is incompressible, the memory management circuit is further configured to issue a command sequence to the rewritable non-volatile memory module in order to program the first data into the first data bits area of the first physical programming unit, and program the first data compression information and the first data management information into the first spare bits area of the first physical programming unit.

An exemplary embodiment of the present invention provides a memory control circuit unit configured to control a rewritable non-volatile memory module. The memory control circuit unit includes: a host interface, a memory interface, a memory management circuit and a data compressing/decompressing circuit. The host interface is configured to couple to a host system. The memory interface is configured to couple to the rewritable non-volatile memory module, wherein the rewritable non-volatile memory module includes a plurality of physical erasing units, and each of the physical erasing units includes a plurality of physical programming units. The memory management circuit is coupled to the host interface and the memory interface, and configures a plurality of logical units for mapping to at least a part of the physical erasing units. The data compressing/decompressing circuit is coupled to the memory management circuit, and configured to perform a compressing operation or a decompressing operation on data. The memory management circuit is configured to divide each of the physical programming units into a data bits area and a spare bits area. The memory management circuit is configured to receive first data. The first data is compressible data. The memory management circuit is configured to instruct the data compressing/decompressing circuit to compress the first data into first compressed data. In addition, the memory management circuit generates first data compression information corresponding to the first data. Information indicating whether the first data is compressed and a compression rate corresponding to the first data are integrated into the first data compression information. Furthermore, the memory management circuit is configured to divide a first data bits area of a first physical programming unit among the physical programming units into a first user data area and a first management information area. The memory management circuit is configured issue a command sequence to the rewritable non-volatile memory module in order to program the first compressed data into the first user data area, program the first data management information corresponding to the first data into the first management information area, and program the first data compression information into the first spare bits area of the first physical programming unit.

An exemplary embodiment of the present invention provides a memory storage apparatus which includes a connection interface unit, a rewritable non-volatile memory module and a memory control circuit unit. The connection interface unit is configured to couple to a host system. The rewritable non-volatile memory module includes a plurality of physical erasing units, and each of the physical erasing units includes a plurality of physical programming units. The memory control circuit unit is coupled to the connection interface unit and the rewritable non-volatile memory module, and configures a plurality of logical units for mapping to at least a part of the physical erasing units. The memory control circuit unit is configured to divide each of the physical programming units into a data bits area and a spare bits area. Further, the memory control circuit unit is further configured to receive a first write command and first data corresponding to the first write command, and generate first data management information corresponding to the first data according to the first write command and the first data. Furthermore, the memory control circuit unit is further configured to determine whether the first data is compressible, and generate first data compression information corresponding to the first data according to a determination result. If the first data is compressible, the memory control circuit unit is further configured to compress the first data to generate first compressed data, program the first compressed data and the first data management information corresponding to the first data into a first data bits area of a first physical programming unit among the physical programming units, and program the first data compression information into the first spare bits area of the first physical programming unit. If the first data is incompressible, the memory control circuit unit is further configured to program the first data into the first data bits area of the first physical programming unit, and program the first data compression information and the first data management information into the first spare bits area of the first physical programming unit.

An exemplary embodiment of the present invention provides a memory storage apparatus, which includes a connection interface unit, a rewritable non-volatile memory module and a memory control circuit unit. The connection interface unit is configured to couple to a host system. The rewritable non-volatile memory module includes a plurality of physical erasing units, and each of the physical erasing units includes a plurality of physical programming units. The memory control circuit unit is coupled to the connection interface unit and the rewritable non-volatile memory module, and configures a plurality of logical units for mapping to at least a part of the physical erasing units. The memory control circuit unit is configured to divide each of the physical programming units into a data bits area and a spare bits area. In addition, the memory control circuit unit is configured to receive first data, wherein the first data is compressible data. Furthermore, the memory control circuit unit is further configured to compress the first data into first compressed data, and generate first data compression information corresponding to the first data. Information indicating whether the first data is compressed and a compression rate corresponding to the first data are integrated into the first data compression information. Furthermore, the memory control circuit unit is configured to divide a first data bits area of a first physical programming unit among the physical programming units into a first user data area and a first management information area. The memory control circuit unit is further configured to program the first compressed data into the first user data area, program first data management information corresponding to the first data into the first management information area, and program the first data compression information into the first spare bits area of the first physical programming unit.

Based on above, the exemplary embodiments of the present invention are capable of storing the data management information corresponding to the compressed data and the corresponding compressed data together into the data bits area without occupying a space of the spare bits area. Accordingly, when a plurality of compressed data is stored into one physical programming unit, the spare bits area of that physical programming unit can still reserve spaces for storing other information. As a result, the use efficiency of the space in the memory storage apparatus may be improved and the related information for compressing data may also be effectively managed.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 12A to 12F are schematic diagrams for storing the compressed data into the physical programming unit according to an exemplary embodiment of the invention.

DESCRIPTION OF THE EMBODIMENTS

Figure 1:
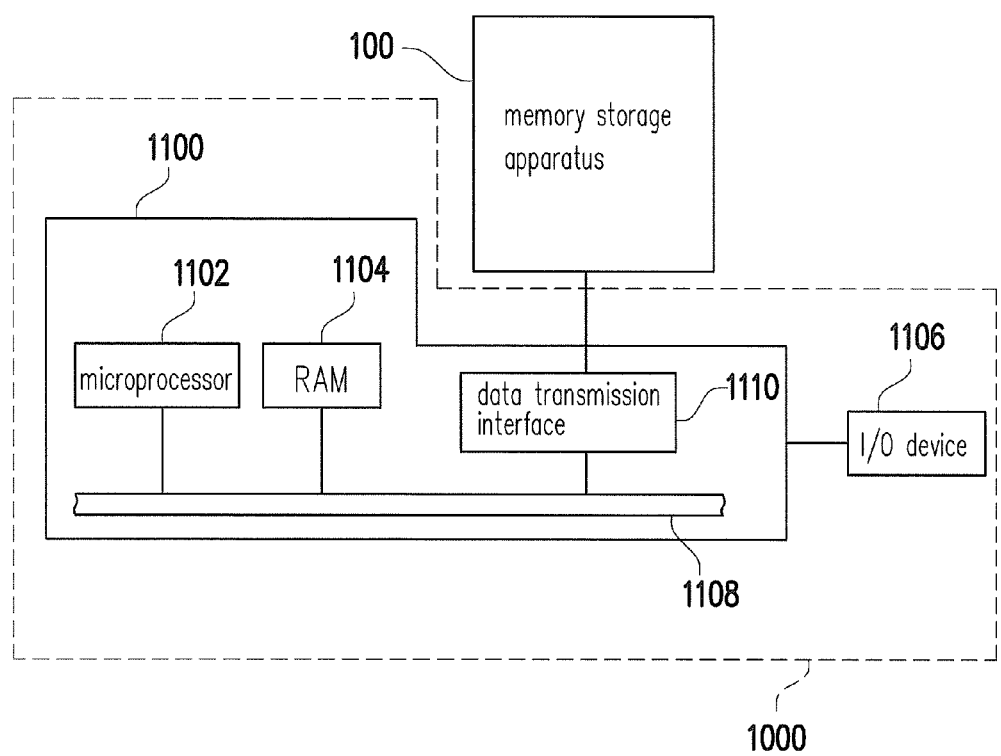
FIG. 1 illustrates a host system and a memory storage apparatus according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

FIG. 1 illustrates a host system and a memory storage apparatus according to an exemplary embodiment.

Figure 2:
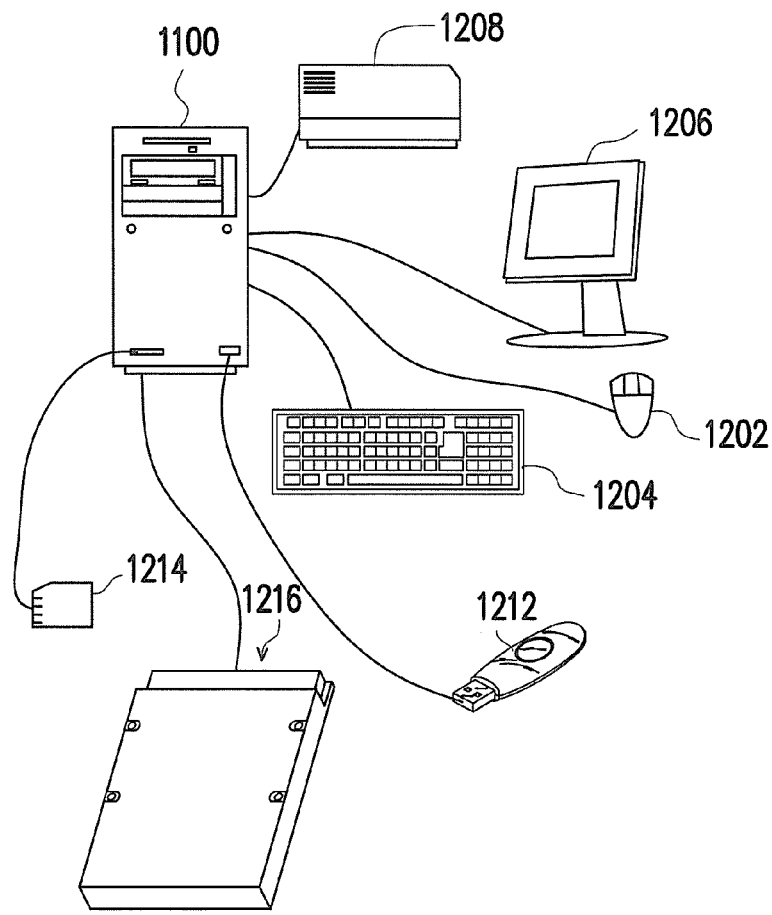
FIG. 2 is a schematic diagram illustrating a computer, an input/output device, and a memory storage apparatus according to an exemplary embodiment of the invention.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 2. It should be understood that the devices illustrated in FIG. 2 are not intended to limit the I/O device 1106, and the I/O device 1106 may further include other devices.

In the exemplary embodiment of the invention, the memory storage apparatus 100 is electrically connected to other devices of the host system 1000 through the data transmission interface 1110. By using the microprocessor 1102, the random access memory 1104 and the Input/Output (I/O) device 1106, data may be written into the memory storage apparatus 100 or may be read from the memory storage apparatus 100. For example, the memory storage apparatus 100 may be a storage apparatus having a rewritable non-volatile memory module such as a flash drive 1212, a memory card 1214, or a solid state drive (SSD) 1216 as shown in FIG. 2.

Figure 3:
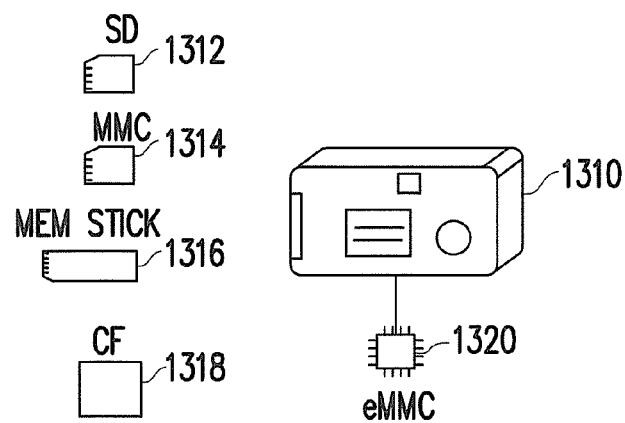
FIG. 3 is a schematic diagram illustrating a host system and a memory storage apparatus according to an exemplary embodiment of the invention.

Generally, the host system 1000 may substantially be any system capable of cooperating with the memory storage apparatus 100 for storing data. Although the host system 1000 is described by using a computer system for example in the present exemplary embodiment, in another exemplary embodiment of the invention, the host system 1000 may be a digital camera, a video camera, a telecommunication device, an audio player, or a video player. For example, when the host system is a digital camera (video camera) 1310, the rewritable non-volatile memory module of the storage apparatus may be a SD card 1312, a MMC card 1314, a memory stick 1316, a CF card 1318 or an embedded storage apparatus 1320 (as shown in FIG. 3). The embedded storage apparatus 1320 includes an embedded MMC (eMMC). It should be mentioned that the eMMC is electrically connected to a substrate of the host system, directly.

Figure 4:
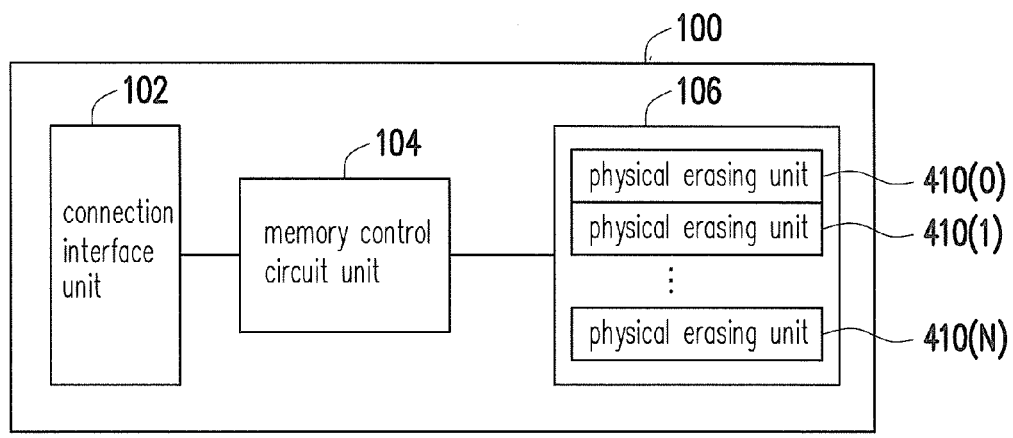
FIG. 4 is a schematic block diagram illustrating the memory storage apparatus depicted in FIG. 1.

FIG. 4 is a schematic block diagram illustrating the memory storage apparatus depicted in FIG. 1.

Referring to FIG. 4, the memory storage apparatus 100 includes a connection interface unit 102, a memory control circuit unit 104 and a rewritable non-volatile memory storage module 106.

In the present exemplary embodiment, the connection interface unit 102 is compatible with a serial advanced technology attachment (SATA) standard. However, the invention is not limited thereto, and the connection interface unit 102 may also be compatible to Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Serial Advanced Technology Attachment (SATA) standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit and the memory control circuit unit may be packaged into one chip, or distributed outside of a chip containing the memory control circuit unit.

The memory control circuit unit 104 is configured to execute a plurality of logic gates or control commands which are implemented in a hardware form or in a firmware form, so as to issue a command sequence for performing operations of writing, reading or erasing data in the rewritable non-volatile memory storage module 106 according to the commands of the host system 1000.

The rewritable non-volatile memory storage module 106 is electrically connected to the memory control circuit unit 104 and configured to store data written from the host system 1000. The rewritable non-volatile memory storage module 106 includes multiple physical erasing units 410(0) to 410(N). For example, the physical erasing units 410(0) to 410(N) may belong to the same memory die or belong to different memory dies. Each of the physical erasing units has a plurality of physical programming units (e.g., in the exemplary embodiments of the invention, each of the physical erasing units includes 258 physical programming units), and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each of the physical programming units usually includes a data bits area (DBA) and a spare bits area (SBA). The data bits area includes a plurality of physical access addresses and configured to store user data, whereas the spare bits area is configured to store system data (e.g., control information, compression information or an error checking and correcting code). In the present exemplary embodiment, the data bits area of each of the physical programming units has the size of 4096 bytes and contains 4 physical access addresses, and the size of each physical access address is 102 bytes. However, in other exemplary embodiments, more or less number of the physical address may be contained in the data bits area, and amount and size of the physical access address are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 106 is a Multi Level Cell (MLC) NAND flash memory module (i.e., a flash memory module capable of storing two bits of data into one memory cell, which is known as the MLC NAND flash memory module hereinafter). However, the present invention is not limited thereto. The rewritable non-volatile memory module 106 may also be a Single Level Cell (SLC) NAND flash memory module, (i.e., a flash memory module capable of storing one bit of data into one memory cell), a Trinary Level Cell (TLC) NAND flash memory module (i.e., a flash memory module capable of storing three bits of data into one memory cell), other flash memory modules or any memory module having the same features.

In the present exemplary embodiment, the physical erasing unit of the MLC NAND flash memory module includes a plurality of physical programming units. Because two bit of data may be stored into one memory cell, each of said physical programming units further includes a lower physical programming unit and an upper physical programming unit. Generally, when the MLC NAND flash memory module is used to store data, a multi level cell mode is used to program the lower physical programming units and the upper physical programming units for writing data into the memory cells.

Figure 5:
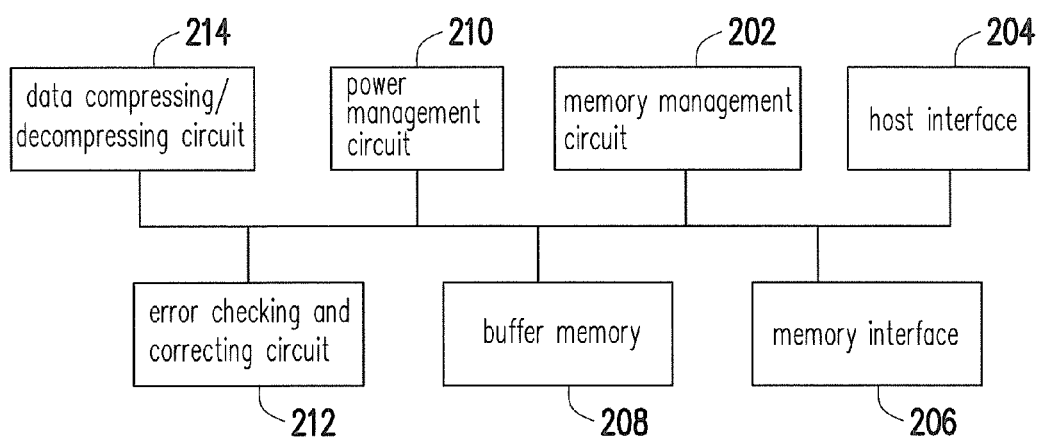
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 104 includes a memory management circuit 202, a host interface 204, a memory interface 206, a buffer memory 208, a power management circuit 210, an error checking and correcting circuit 212, and a data compressing/decompressing circuit 214.

The memory management circuit 202 is configured to control overall operations of the memory control circuit unit 104. Specifically, the memory management circuit 202 has a plurality of control commands. During operations of the memory storage apparatus 100, the control commands are executed to perform various operations such as writing, reading and erasing data.

In the present exemplary embodiment, the control commands of the memory management circuit 202 are implemented in a form of a firmware. For instance, the memory management circuit 202 has a microprocessor unit (not illustrated) and a ROM (not illustrated), and the control commands are burned into the ROM. During operations of the memory storage apparatus 100, the control commands are executed by the microprocessor to perform the operations of writing, reading or erasing data.

In another exemplary embodiment of the invention, the control commands of the memory management circuit 202 may also be stored as program codes in a specific area (for example, the system area in a memory exclusively used for storing system data) of the rewritable non-volatile memory module 106. In addition, the memory management circuit 202 has a microprocessor unit (not illustrated), a ROM (not illustrated) and a RAM (not illustrated). Particularly, the ROM has an activate code, which is executed by the microprocessor unit to load the control commands stored in the rewritable non-volatile memory module 106 to the RAM of the memory management circuit 202 when the memory control circuit unit 104 is enabled. Thereafter, the control commands are executed by the microprocessor unit to perform operations of writing, reading or erasing data.

Further, in another exemplary embodiment of the invention, the control commands of the memory management circuit 202 may also be implemented in a form of hardware. For example, the memory management circuit 202 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are electrically connected to the microprocessor. The memory cell management circuit is configured for managing the physical erasing unit of the rewritable non-volatile memory module 106; the memory writing circuit is configured for issuing a write command to the rewritable non-volatile memory module 106 in order to write data into the rewritable non-volatile memory module; the memory reading circuit is configured for issuing a read command to the rewritable non-volatile memory module 106 in order to read data from the rewritable non-volatile memory module 106; the memory erasing circuit is configured for issuing an erase command to the rewritable non-volatile memory module 106 in order to erase data from the rewritable non-volatile memory module 106; the data processing circuit is configured for processing both the data to be written into the rewritable non-volatile memory module 106 and the data to be read from the rewritable non-volatile memory module 106.

The host interface 204 is electrically connected to the memory management circuit 202 and configured to receive and identify commands and data sent from the host system 1000. Namely, the commands and data sent from the host system 1000 are sent to the memory management circuit 202 through the host interface 204. In the present exemplary embodiment, the host interface 204 is compatible to a SATA standard. However, it should be understood that the present invention is not limited thereto, and the host interface 204 may also be compatible with a PATA standard, an IEEE 1394 standard, a PCI Express standard, a USB standard, a UHS-I standard, a UHS-II standard, a MS standard, a MMC standard, a CF standard, an IDE standard, or other suitable standards for data transmission.

The memory interface 206 is electrically connected to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

In an exemplary embodiment of the present invention, the memory control circuit unit 104 further includes a buffer memory 208, a power management circuit 210 and an error checking and correcting circuit 212.

The buffer memory 208 is electrically connected to the memory management circuit 202 and configured to temporarily store data and commands from the host system 1000 or data from the rewritable non-volatile memory module 106.

The power management unit 210 is electrically connected to the memory management circuit 202 and configured to control a power of the memory storage apparatus 100.

The error checking and correcting circuit 212 is electrically connected to the memory management circuit 202 and configured to perform an error checking and correcting process to ensure the correctness of data. Specifically, when the memory management circuit 202 receives a write command from the host system 1000, the error checking and correcting circuit 212 generates an error checking and correcting code (ECC code) for data corresponding to the write command, and the memory management circuit 202 writes data and the ECC code corresponding to the write command to the rewritable non-volatile memory module 106. Thereafter, when reading data from the rewritable non-volatile memory module 106, the memory management circuit 202 also reads the ECC Code corresponding to such data, and the error checking and correcting circuit 212 performs an error checking and correcting process on the read data based on the read ECC code.

The data compressing/decompressing circuit 214 is coupled to the memory management circuit 202. Herein, the data compressing/decompressing circuit 214 is configured to compress data to be written into the rewritable non-volatile memory module 106 and configured to decompress the data read from the rewritable non-volatile memory module 106. For example, the data compressing/decompressing circuit 214 includes a compressor and a decompressor. The compressor is configured to locate a data redundancy existed in original data, remove the located data redundancy, and encode the rest of necessary data and then output an encoded result (i.e., a compressed data). The decompressor is configured to decode the read compressed data according to given steps and output a decoded result (i.e., a decompressed data). In the present exemplary embodiment, the data compressing/decompressing circuit 214 compresses data by using a lossless compression algorithm, so that the compressed data may be restored later.

Figure 6:
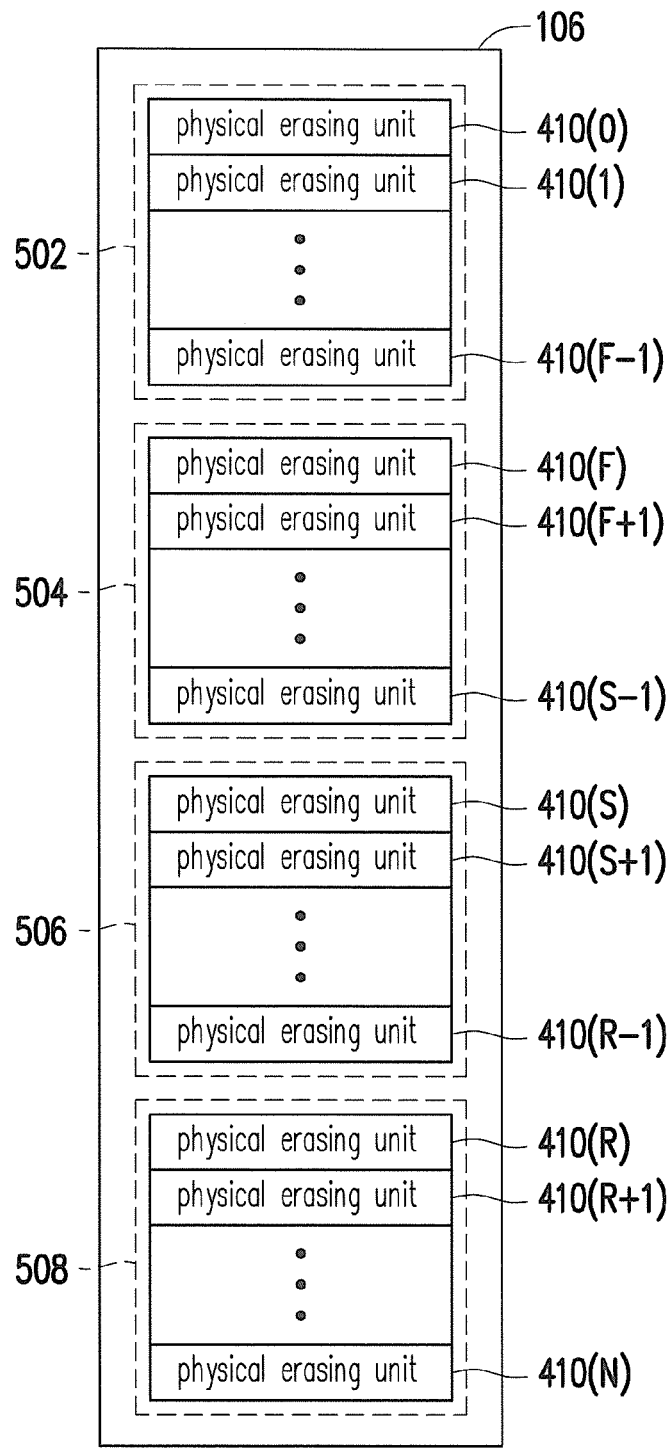
FIG. 6 illustrates a schematic diagram for writing data into the physical page according to an exemplary embodiment of the invention.
Figure 7:
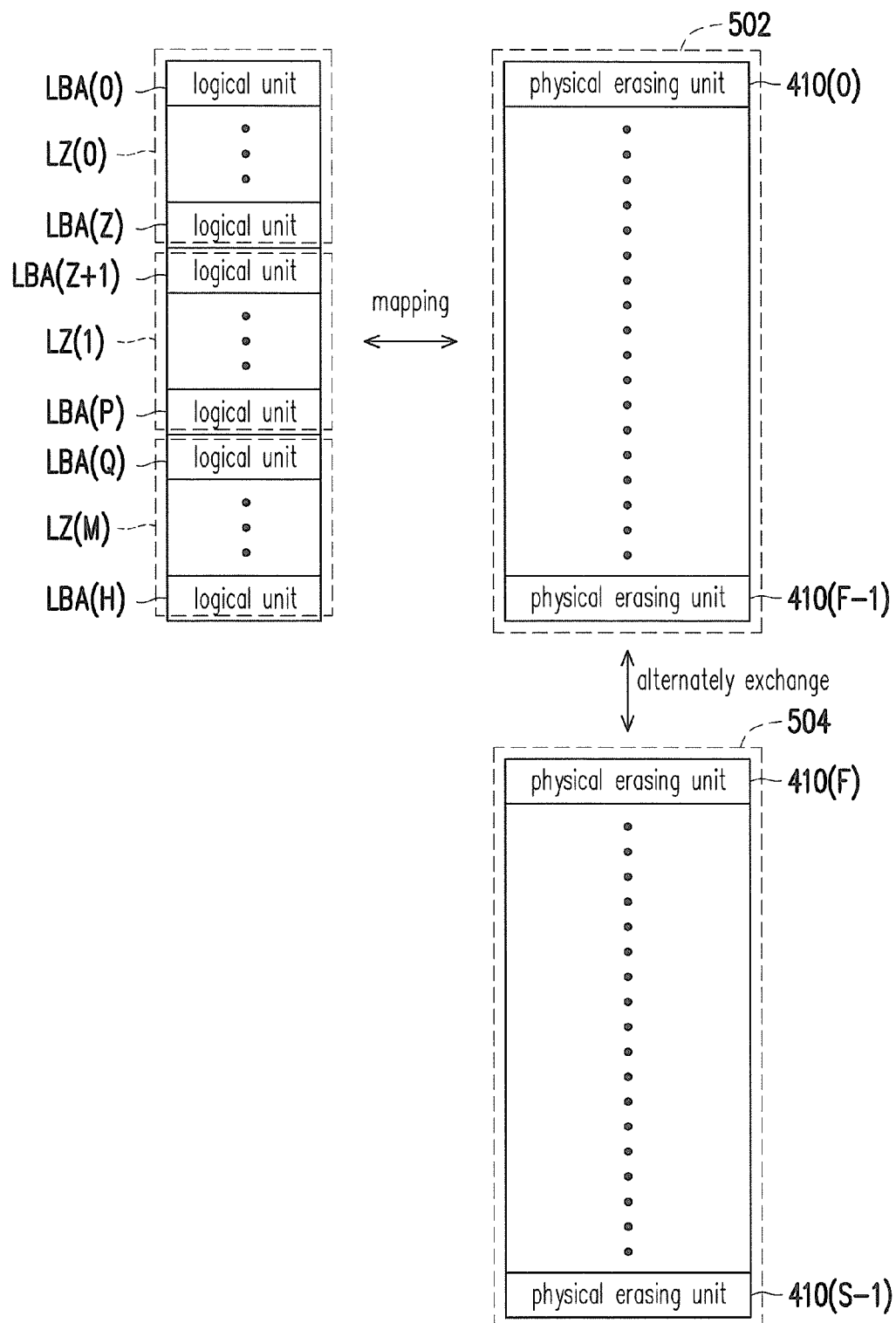
FIG. 7 is a schematic diagram illustrating a management of physical blocks according to first exemplary embodiment.

FIG. 6 and FIG. 7 are schematic diagrams illustrating a management of the physical erasing units according to an exemplary embodiment of the present invention.

Referring to FIG. 6, the memory control circuit unit 104 (or the memory management circuit 202) may logically group the physical erasing units 410(0) to 410(N) into a data area 502, a spare area 504, a system area 506 and a replacement area 508.

The physical erasing units logically belonging to the data area 502 and the spare area 504 are configured to store data from the host system 1000. More specifically, the physical erasing units of the data area 502 are regarded as the physical erasing units stored with the data, whereas the physical erasing units of the spare area 504 are configured for exchanging the physical erasing units of the data area 502. In other words, when the write command and the data to be written are received from the host system 1000, the memory management unit 202 may retrieve the physical erasing units from the spare area 504, and write the data into the retrieved physical erasing units for exchanging the physical erasing units in the data area 502.

The physical erasing units logically belonging to the system area 506 are configured to record system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 508 are used in a bad physical erasing unit replacement procedure for replacing damaged physical erasing units. More specifically, if available physical erasing units are still present in the replacement area 508 when the physical erasing units of the data area 502 are damaged, the memory management circuit 202 may retrieve the available physical erasing units from the replacement area 508 for replacing the damaged physical erasing units.

In particular, the numbers of the physical erasing units in the data area 502, the spare area 504, the system 506 and the replacement area 508 may be different from one another according to the different memory specifications. In addition, it should be understood that, during operations of the memory storage apparatus 100, grouping relations of the physical erasing units for associating with the data area 502, the spare area 504, the system area 506, and replacement area 508 may be dynamically changed. For example, when the damaged physical erasing units in the spare area 504 are replaced by the physical erasing units in the replacement area 508, the physical erasing units originally from the replacement area 508 are then associated with the spare area 504.

Referring to FIG. 7, the memory control circuit unit 104 (or the memory management circuit 202) may be disposed with logical units LBA(0) to LBA(H) for the physical erasing units of the data area 502, in which each of the logical units includes a plurality of logical sub-units for mapping to the corresponding physical programming units of the physical erasing units. Further, when the host system 1000 intends to write the data into the logical units or update the data stored in the logical units, the memory control circuit unit 104 (or the memory management unit 202) may retrieve one physical erasing units from the spare area 504 for writing the data as an alternately exchange of the physical erasing units of the data area 502. In this exemplary embodiment, the logical sub-units may be logical pages or logical sectors. In the present exemplary embodiment, the logical sub-units are the logical pages each having the size of 4 kilobytes (4K bytes) which is identical to the size of the physical programming unit.

In order to identify which of the physical erasing units is stored with the data of each logical unit, the memory control circuit unit 104 (or the memory management circuit 202) may record the mapping relations between the logical units and the physical erasing units in the present exemplary embodiment. Further, when the host system 1000 intends to access the data in the logical sub-unit, the memory control circuit unit 104 (or the memory management circuit 202) may first confirm the logical unit to which that logical sub-unit belongs, and issue a corresponding command sequence to access the data in the physical erasing units mapped to the logical unit. For instance, in the present exemplary embodiment, the memory control circuit unit 104 (or the memory management circuit 202) may store a logical-to-physical address mapping table into the rewritable non-volatile memory module 106 for recording the physical erasing units mapped to each of the logical units, and the logical-to-physical address mapping table are loaded into the buffer memory 208 for maintenance when the memory control circuit unit 104 (or the memory management circuit 202) intends to the access the data.

It should be noted that, the mapping table cannot record the mapping relation for all of the logical units because a capacity of the buffer memory 208 is limited. Therefore, in the present exemplary embodiment, the memory control circuit unit 104 (or the memory management unit 202) groups the logical units LBA(0) to LBA(H) as a plurality of logical zones LZ(0) to LZ(M), and disposes one logical-to-physical address mapping table for each of the logical zones. In particular, when the memory control circuit unit 104 (or the memory management unit 202) intends to update the mapping table for one specific logical unit, the logical-to-physical address mapping table of the logical zone to which the logical unit belongs is correspondingly loaded into the buffer memory 208 for updating.

As described above, in the present exemplary embodiment, the rewritable non-volatile memory module 106 of the memory storage apparatus 100 is managed on basis of the physical programming units. Accordingly, when the write command is executed, no matter the current data is to be written into the logical sub-unit of which logical unit, the memory control circuit unit 104 (or the memory management unit 202) may write the data in a manner of one physical programming unit after another physical programming unit. More specifically, the memory control circuit unit 104 (or the memory management circuit 202) may retrieve an empty physical erasing unit from the spare area 504 to be used as a current physical erasing unit for writing data. Further, when the current physical erasing unit used is fully written, the memory control circuit unit 104 (or the memory management circuit 202) may retrieve another empty physical erasing unit from the spare area 504 to serve as the current physical erasing unit used to continuously write the data corresponding to the write command from the host system 1000.

In the present exemplary embodiment, as described above, the error checking and correcting circuit 212 of the memory storage apparatus 100 is configured to verify whether the data stored in the rewritable non-volatile memory module 106 is correct. However, when an error correction procedure is executed in either the encoding step or the decoding step, the error checking and correcting circuit 212 needs to clearly know of a data length to be protected, so as to calculate for a correct feature code in order to check a correct location where the error occurs. In the present exemplary embodiment, when the data is received by the memory control circuit unit 104 (or the memory management circuit 202), the memory control circuit unit 104 (or the memory management circuit 202) first divides the data into at least one frame. Thereafter, the error checking and correcting circuit 212 may generate a corresponding error checking and correcting code (ECC) for the data in each frame. Subsequently, the memory control circuit unit 104 (or the memory management circuit 202) may group the data in each frame and the corresponding error checking and correcting code into an error checking and correcting frame, and write the data into the rewritable non-volatile memory module 106 in units of the error checking and correcting frame. Herein, the size of the error checking and correcting frame is divided according to the size of a transmission unit, and the size of the transmission is decided according to a specification (e.g., bits to be protected per transmission unit) of the rewritable non-volatile memory module 106. For example, 24 bits are protected when the transmission unit is 4K bytes. When the error checking and correcting frame is set to 4K bytes, the memory control circuit unit 104 (or the memory management circuit 202) may divide the data into a frame that is less than 4K bytes per unit. The error checking and correcting circuit 212 may execute an error correcting encoding for the data in each frame, so that a total of sizes of the generated error checking and correcting code and each frame is 4K bytes.

Nevertheless, it should be understood that the invention is not limited thereto. In another exemplary embodiment, the size of the error checking and correcting frame may also be 1K bytes, 2K bytes or 3K byte and so forth. It is worth mentioning that, each of the physical programming units stores at least one error checking and correcting frame, such that the data stored in the physical programming units may be protected by the error checking and correcting circuit 212 in units of the size the error checking and correcting frame.

For example, in the present exemplary embodiment, a maximum protection that the error checking and correcting circuit 212 can provide is 24 bits. Accordingly, when the number of error bits in the error checking and correcting frame is greater than 24 (e.g., 25), the error checking and correcting circuit 212 is unable to correct error data in the error checking and correcting frame. As a result, the data stored in the error checking and correcting frame cannot be read normally and becomes damaged data that cannot be recovered. In this case, it also indicates that the physical erasing unit having the damaged data is already unusable due to aged deterioration. Therefore, the memory control circuit unit 104 (or the memory management circuit 202) may mark the physical programming unit having the number of the error bits exceeding the maximum protection of the error checking and correcting circuit 212 as a bad physical programming unit, and record the same in a bad physical programming unit distribution table.

Figure 8:
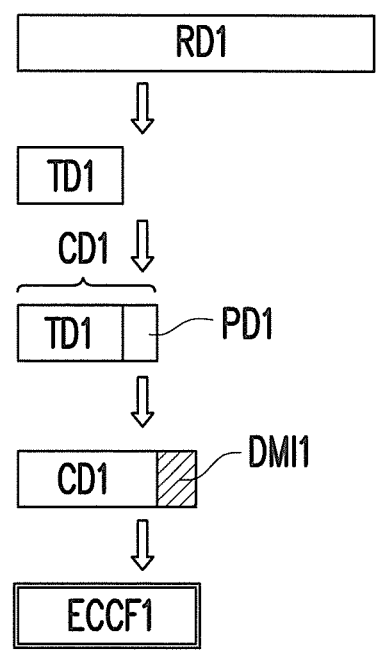
FIG. 8 illustrates a schematic diagram for adding padding data and data management information to transition data according to an exemplary embodiment of the invention.

FIG. 8 illustrates a schematic diagram for adding padding data and data management information to transition data according to an exemplary embodiment of the present invention.

Referring to FIG. 8, for instance, in the present exemplary embodiment, when the memory control circuit unit 104 (or the memory management circuit 202) intends to write first data RD1 having the data length being 4K bytes into the physical programming unit, the data compressing/decompressing circuit 214 may scan the first data RD1 and test whether the first data RD1 is compressible. If the first data RD1 is compressible, the data compressing/decompressing circuit 214 may obtain a data pattern of the first data RD1 after scanning and testing the first data RD1. Next, the data compressing/decompressing circuit 214 may use a compression method and a compression rate suitable for the data pattern of the first data RD1 to perform a compressing operation on the first data RD1 in order to output first transition data TD1. It is worth mentioning that, in the present exemplary embodiment, before compressing the first data RD1, the memory control circuit unit 104 (or the memory management circuit 202) may instruct the error checking and correcting circuit 212 to generate a first error checking and correcting code corresponding to the first data RD1 for the first data RD1, and store the first error checking and correcting code into first data management information DMI1 corresponding to the first data RD1. In addition, during the compressing operation, the data compressing/decompressing circuit 214 may compress the data by using the lossless compression algorithm, so that the compressed data may be completely restored later. Nevertheless, it should be understood that the invention is not limited by the lossless compression algorithm. After compressing the first data RD1, the memory control circuit unit 104 (or the memory management circuit 202) may record related information regarding the compression method and the compression rate for performing the compressing operation on the first data RD1 into first data compression information, wherein the first data compression information also records information regarding whether the first data RD1 is compressed.

However, the different writing data being compressed may generate the compressed data different having different lengths. In order to facilitate the management of information, the data compressing/decompressing circuit 214 may output the generated compressed data by using a preset compression length. In other words, the length of the generated compressed data is equal to the preset compression length. It is worth mentioning that, in the present exemplary embodiment, different preset compression lengths are used in correspondence to the data being compressed.

Specifically, assuming that the length of the first data being compressed is between 1 to 1016 bytes, the data compressing/decompressing circuit 214 may add one padding data (e.g., first padding data PD1 depicted in FIG. 8) after the generated first transition data TD1 in order to generate first compressed data CD1, wherein a length of the first compressed data CD1 is equal to a first preset compression length (i.e., 1016 bytes). When the length of the first data being compressed is between 1017 to 2040 bytes, the data compressing/decompressing circuit 214 may add one padding data after the generated first transition data TD1 in order to generate the first compressed data CD1, wherein the length of the first compressed data CD1 is equal to a second preset compression length (i.e., 2040 bytes). When the length of the first data being compressed is between 2041 to 3064 bytes, the data compressing/decompressing circuit 214 may add one padding data after the generated first transition data TD1 in order to generate the first compressed data CD1, wherein the length of the first compressed data CD1 is equal to a third preset compression length (i.e., 3064 bytes). When the length of the first data being compressed is between 3065 to 4088 bytes, the data compressing/decompressing circuit 214 may add one padding data after the generated first transition data TD1 in order to generate the first compressed data CD1, wherein the length of the first compressed data CD1 is equal to a fourth preset compression length (i.e., 4088 bytes).

Subsequently, the memory control circuit unit 104 (or the memory management circuit 202) may add data management information (hereinafter, known as the first data management information DMI1) corresponding to the first data RD1 after the first compressed data CD1. For example, the size of the first data management information DMI1 is 8 bytes. Subsequently, the memory control circuit unit 104 (or the memory management circuit 202) may integrate the first compressed data CD1 and the first data management information DMI1 into a first error checking and correcting frame ECCF1.

In the present exemplary embodiment, the size of the first error correcting coding frame ECCF1 is decided according to the first compressed data CD1. For instance, if the size of the first compressed data CD1 is the first preset compression length (i.e., 1016 bytes), the size of the generated first error checking and correcting frame ECCF1 is the size of the first error checking and correcting frame, which is 1024 bytes. If the size of first compressed data CD1 is the second preset compression length (i.e., 2040 bytes), the size of the generated first error checking and correcting frame ECCF1 is the size of the second error checking and correcting frame, which is 2048 bytes. If the size of first compressed data CD1 is the third preset compression length (i.e., 3064 bytes), the size of the generated first error checking and correcting frame ECCF1 is the size of the third error checking and correcting frame, which is 3072 bytes. If the size of first compressed data CD1 is the fourth preset compression length (i.e., 4088 bytes), the size of the generated first error checking and correcting frame ECCF1 is the size of the fourth error checking and correcting frame, which is 4096 bytes. It is worth mentioning that, setting the sizes of the preset compression lengths and the error correcting coding frames are only illustrative instead of limitation to the invention.

Referring to FIG. 8, for instance, when the memory control circuit unit 104 (or the memory management circuit 202) intends to write the first data RD1 having the data length being 4K bytes into the retrieved first physical programming unit, the data compressing/decompressing circuit 214 may decide whether the first data RD1 is compressible or how to perform the compression according to the data pattern of the first data RD1, generate the first error checking and correcting code for the first data RD1 before compressing the first data RD1, and store the first error checking and correcting code into the first data management information DMI1 corresponding to the first data RD1. Subsequently, the data compressing/decompressing circuit 214 may compress the first data RD1 into the first transition data TD1 having the size of 2000 bytes. Subsequently, because 2000 bytes is between 1017 to 2040 bytes, the data compressing/decompressing circuit 214 may add the first padding data PD1 after the generated first transition data TD1 in order to output the first compressed data CD1 having the length being the second preset compression length (i.e., 2040 bytes).

Thereafter, the memory control circuit unit 104 (or the memory management circuit 202) may add the first data management information DMI1 corresponding to the first data RD1 having the size of 8 K bytes after the first compressed data CD1. Accordingly, the first error checking and correcting frame ECCF1 is formed by the first compressed data CD1 and the first data management information DMI1. Because the length of the first compressed data CD1 is the second preset compression length (i.e., 2040 bytes), the length of the first error checking and correcting frame ECCF1 is 2048 bytes.

In addition, in the present exemplary embodiment, the memory control circuit unit 104 (or the memory management circuit 202) further stores information regarding the compression method corresponding to the first transition data TD1 into first compression information (not illustrated) of a first spare bits area SBA1. Also, when reading the first transition data TD1, the memory control circuit unit 104 (or the memory management circuit 202) may instruct the data compressing/decompressing circuit 214 according to the first compression information, so as to use the compression method corresponding to the first transition data TD1 to decompress the first transition data TD1. In the foregoing examples, bit value of each bit of the first padding data PD1 is "1", but the invention is not limited thereto. In other words, the padding data may be a set of fixed bit values.

It is worth mentioning that, in the present exemplary embodiment, the first padding data PD1 is added after the first transition data TD1. Nevertheless, it should be understood that the invention is not limited thereto. The first padding data PD1 may also be placed before the first transition data TD1 or inserted into the first transition data TD1. In addition, the first padding data PD1 may be dummy data, or dummy data having an error checking code corresponding to the first data RD1, wherein the error checking code may be a cyclic redundancy check code or a parity check code corresponding to the first data RD1, but the invention is not limited thereto. In other words, the padding data may be any data pattern, as long as the padding data can be added to the compressed data so that the length of the compressed data is the preset compression length.

Particularly, when it is required to add the first padding data PD1 to the first transition data TD1 in order to generate the first compressed data CD1, the data compressing/decompressing circuit 214 may store padding information regarding the first data into the first data compression information, so as to record the size of the first padding data PD1 included in the first compressed data CD1. In addition, the padding information corresponding to the first data also includes a location of the first padding data PD1 in the first compressed data CD1 for restoring the first transition data TD1 during the decompression. For example, the padding information may be recorded in a physical block for storing system data in the rewritable non-volatile memory module 106, stored into a mapping table or stored into the first data compression information corresponding to the first data, wherein the first data compression information may also be stored into the first spare bits area SBA1 of the first physical programming unit storing the first data RD1 or into the first data management information DMI1 corresponding to the first data RD1.

Figure 9:
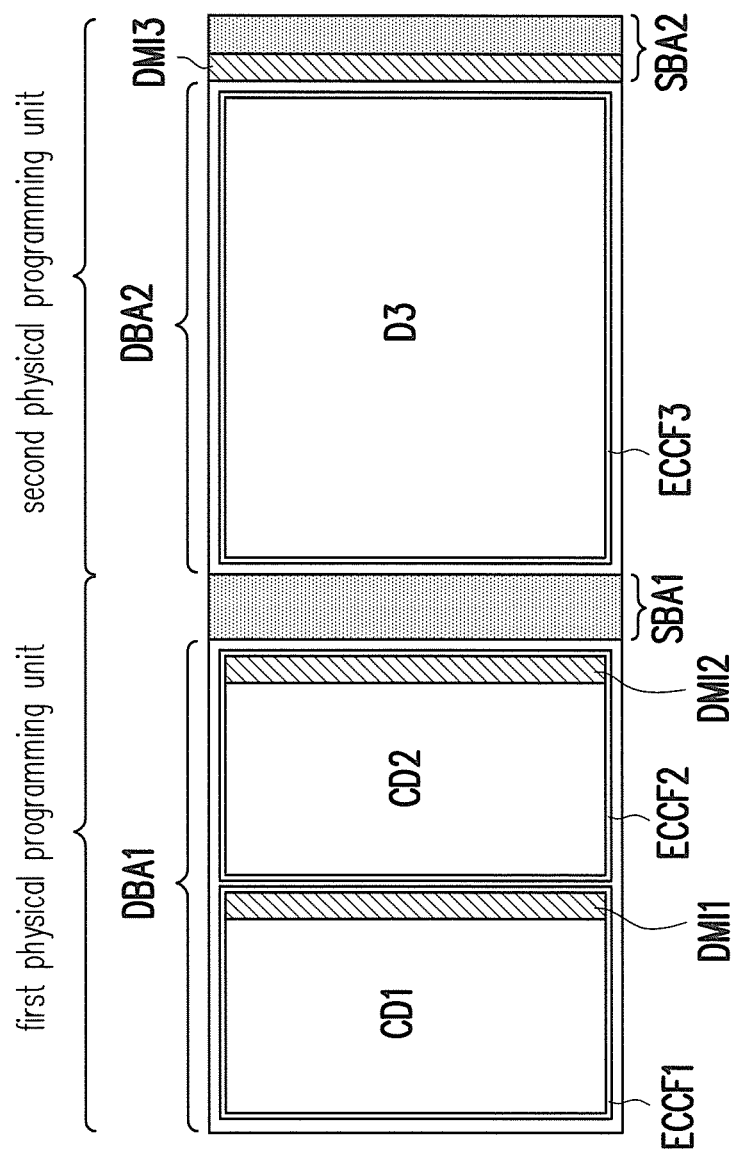
FIG. 9 illustrates an example of storing the compressed data and the non-compressed data into the physical programming units according to an exemplary embodiment of the invention.

It is worth mentioning that, in another exemplary embodiment, the memory control circuit unit 104 (or the memory management circuit 202) may instruct the error checking and correcting circuit 212 to generate a first error detection code corresponding to the first error checking and correcting frame ECCF1 for the error checking and correcting frame ECCF1, and store the first error checking and correcting frame ECCF1 into the first data bits area DBA1 of the first physical programming unit (referring to FIG. 9). Meanwhile, the memory control circuit unit 104 (or the memory management circuit 202) may store the generated first error detection code corresponding to the first error checking and correcting frame ECCF1 into the first spare bits area SBA1 of the first physical programming unit, wherein the error detection code may be a cyclic redundancy check code or a parity check code corresponding to the first error checking and correcting frame ECCF1, but the present invention is not limited thereto. Before the first transition data TD1 is decompressed by the memory control circuit unit 104 (or the memory management circuit 202), the memory control circuit unit 204 (or the memory management circuit 202) may also instruct the error checking and correcting circuit 212 to check the first error checking and correcting frame ECCF1 by using the first error detection code corresponding to the first error checking and correcting frame ECCF1 and stored in the first spare bits area SBA1. If the error is not detected, the memory control circuit unit 104 (or the memory management circuit 202) may decompress and decode the first transition data TD1 into the first data RD1 according to the first data compression information and the information stored in the first data management information DMI1.

In the present exemplary embodiment, the memory control circuit unit 104 (or the memory management circuit 202) may write the generated first error checking and correcting frame ECCF1 into the first data bits area DBA1 of the first physical programming unit. In another exemplary embodiment, the error checking and correcting circuit 212 may further generate the corresponding first error detection code according to the first error checking and correcting frame ECCF1, and the memory control circuit unit 104 (or the memory management circuit 202) may store the generated first error detection code into the first spare bits area SBA1 of the first physical programming unit correspondingly stored with the first error checking and correcting frame ECCF1.

Thereafter, when the memory control circuit unit 104 (or the memory management circuit 202) intends to read the data from the physical programming unit for responding back to the host system 1000, the memory management circuit 202 and the data compressing/decompressing circuit 214 must restore the data in a manner of reversed procedure.

FIG. 9 illustrates an example of storing the compressed data and the non-compressed data into the physical programming units according to an exemplary embodiment of the present invention.

Referring to FIG. 9, for instance, the first physical programming unit is divided into the first data bits area DBA1 and the spare bits area SBA1, and a second physical programming unit is divided into a second data bits area DBA2 and a second spare bits area SBA2. The first data RD1 is compressible data and already compressed into the first compressed data CD1, wherein the size of the first compressed data CD1 is 2040 bytes. Second data RD2 is the compressible data and already compressed into second compressed data CD2, wherein the size of the second compressed data CD2 is 2040 bytes. Third data D3 is incompressible data having the size of 4096 bytes. The first data bits area DBA1 of the first physical programming unit is stored with two error checking and correcting frames including one being the first error checking and correcting frame ECCF1 and another being a second error checking and correcting frame ECCF2, both having the size of a second error checking and correcting frame length (i.e., 2048 bytes). The first error checking and correcting frame ECCF1 includes the first compressed data CD1 and the first data management information DMI1, and the second error checking and correcting frame ECCF2 includes the second compressed data CD2 and second data management information DMI2. In view of FIG. 9, none of the first data management information DMI1 related to the first data RD1 and the second data management information DMI2 related to the second data will occupy a space of the first spare bits area SBA1. In contrast, since the third data D3 is the incompressible data having the size of 4096 bytes, the third data D3 may be stored entirely into the second data bits area of the second physical programming unit, and third data management information DMI3 related to the third data D3 is stored into the second spare bits area SBA2 of the second physical programming unit. In other words, the invention is capable of storing the data management information corresponding to the compressed data and the corresponding compressed data together into the data bits area without occupying a space of the spare bits area. Accordingly, when a plurality of compressed data is stored into one physical programming unit, the spare bits area of that physical programming unit can still reserve spaces for storing other information.

Figure 10:
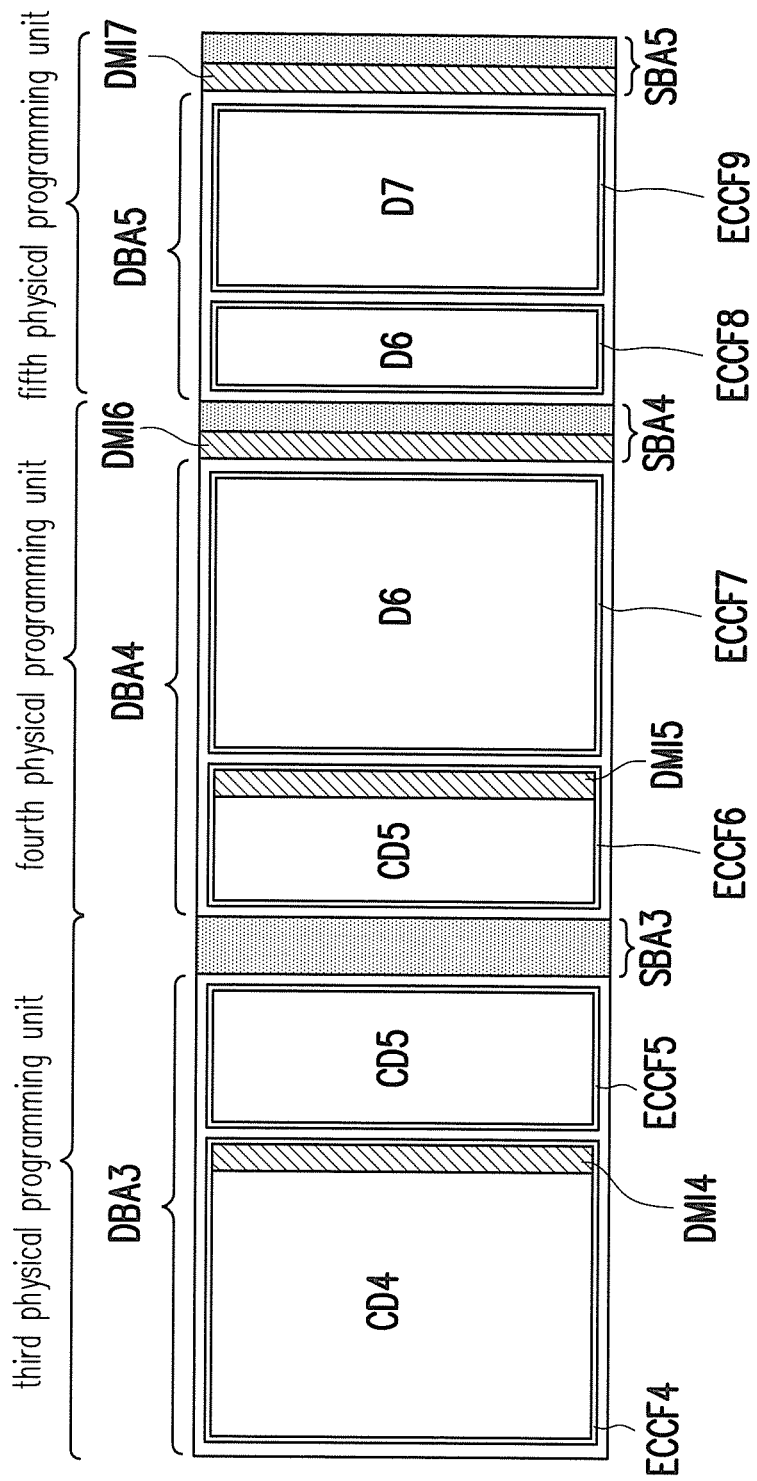
FIG. 10 illustrates another example of storing the compressed data and the non-compressed data into the physical programming units according to an exemplary embodiment of the invention.

FIG. 10 illustrates another example of storing the compressed data and the non-compressed data into the physical programming units according to an exemplary embodiment of the present invention.

Referring to FIG. 10, for instance, a third physical programming unit is divided into a third data bits area DBA3 and a third spare bits area SBA3, wherein the size of the third data bits area DBA3 is 4096 bytes. A fourth physical programming unit is divided into a fourth data bits area DBA4 and a fourth spare bits area SBA4, wherein the size of the fourth data bits area DBA4 is 4096 bytes. A fifth physical programming unit is divided into a fifth data bits area DBA5 and a fifth spare bits area SBA5, wherein the size of the fifth data bits area DBA5 is 4096 bytes. Herein, fourth data RD4 is the compressible data and already compressed into fourth compressed data CD4, wherein the size of the fourth compressed data CD4 is 3064 bytes. Fifth data RD5 is the compressible data and already compressed into fifth compressed data CD5, wherein the size of the fifth compressed data CD5 is 2040 bytes. Sixth data D6 is the incompressible data having the size of 4096 bytes. Also, seventh data D7 is the incompressible data having the size of 3072 bytes.

In FIG. 10, the third data bits area DBA3 of the third physical programming unit is stored with two error checking and correcting frames including one being a fourth error checking and correcting frame ECCF4 having the size of a third error checking and correcting frame length (i.e., 3072 bytes) and another being a fifth error checking and correcting frame ECCF5 having the size of a first error checking and correcting frame length (i.e., 1024 bytes). The fourth error checking and correcting frame ECCF4 includes the fourth compressed data CD4 and fourth data management information DMI4, and the fifth error checking and correcting frame ECCF5 includes a first part of the fifth compressed data CD5. The fifth compressed data CD5 is divided into two parts because the fifth compressed data CD5 cannot be stored entirely into the third data bits area DBA3. The first part (i.e., a first half having the size of 1024 bytes) of the fifth compressed data CD5 is grouped into the fifth error checking and correcting frame ECCF5, and stored into the third data bits area DBA3 successively after the fourth error checking and correcting frame ECCF4. A second part (i.e., a second half having the size of 1016 bytes) of the fifth compressed data CD5 and the fifth data management information DMI5 corresponding to the fifth data RD5 are grouped into a sixth error checking and correcting frame ECCF6, and the sixth error checking and correcting frame ECCF6 is stored into the fourth data bits area DBA4 of the fourth physical programming unit, wherein the size of the sixth error checking and correcting frame ECCF6 is the first error checking and correcting frame length (i.e., 1024 bytes).

As described above, since the fourth data bits area DBA4 of the fourth physical programming unit is already stored with the sixth error checking and correcting frame ECCF6, when the memory control circuit unit 104 (or the memory management circuit 202) intends to store the sixth data D6 which is incompressible, the sixth data D6 is divided into two parts because the sixth data D6 cannot be stored entirely into the fourth data bits area DBA4. A first part (i.e., a first half having the size of 3072 bytes) of the sixth data D6 is grouped into a seventh error checking and correcting frame ECCF7 and stored into the fourth data bits area DBA4 successively after the sixth error checking and correcting frame ECCF6, wherein the size of the seventh error checking and correcting frame ECCF7 is the third error checking and correcting frame length. Subsequently, since the sixth data D6 is stored into the fourth physical programming unit, the memory control circuit unit 104 (or the memory management circuit 202) may store sixth data management information DMI6 corresponding to the sixth data D6 into the fourth spare bits area SBA4 of the fourth physical programming unit. And, a second part (i.e., a second half having the size of 1024 bytes) of the sixth data D6 is grouped into an eighth error checking and correcting frame ECCF8, and the eighth error checking and correcting frame ECCF8 is stored into the fifth data bits area DBA5 of the fifth physical programming unit, wherein the size of the eighth error checking and correcting frame ECCF8 is the first error checking and correcting frame length.

It is worth mentioning that, in another exemplary embodiment, the memory control circuit unit 104 (or the memory management circuit 202) may generate the first data management information DMI1 according to the first transition data TD1, and decide which of the error checking and correcting frame lengths is to be used as the size of the first error checking and correcting frame for storing the first transition TD1 and the data management information DMI1 according to a total of the sizes of the first transition data TD1 and the first data management information DMI1, and fill the first padding data PD1 into the space which is not yet filled. For instance, if the size of the first transition data TD1 is 2000 bytes and the size of the first data management information DMI1 is 10 bytes, the memory control circuit unit 104 (or the memory management circuit 202) may group the first transition data TD1 and the first data management information DMI1 into the first error checking and correcting frame having the size of the second error checking and correcting frame length (i.e., 2048 bytes), and add the first padding data PD1 having the size of 38 bytes (i.e., 2048−2000−10=38) into the first error checking and correcting frame.

Figure 11:
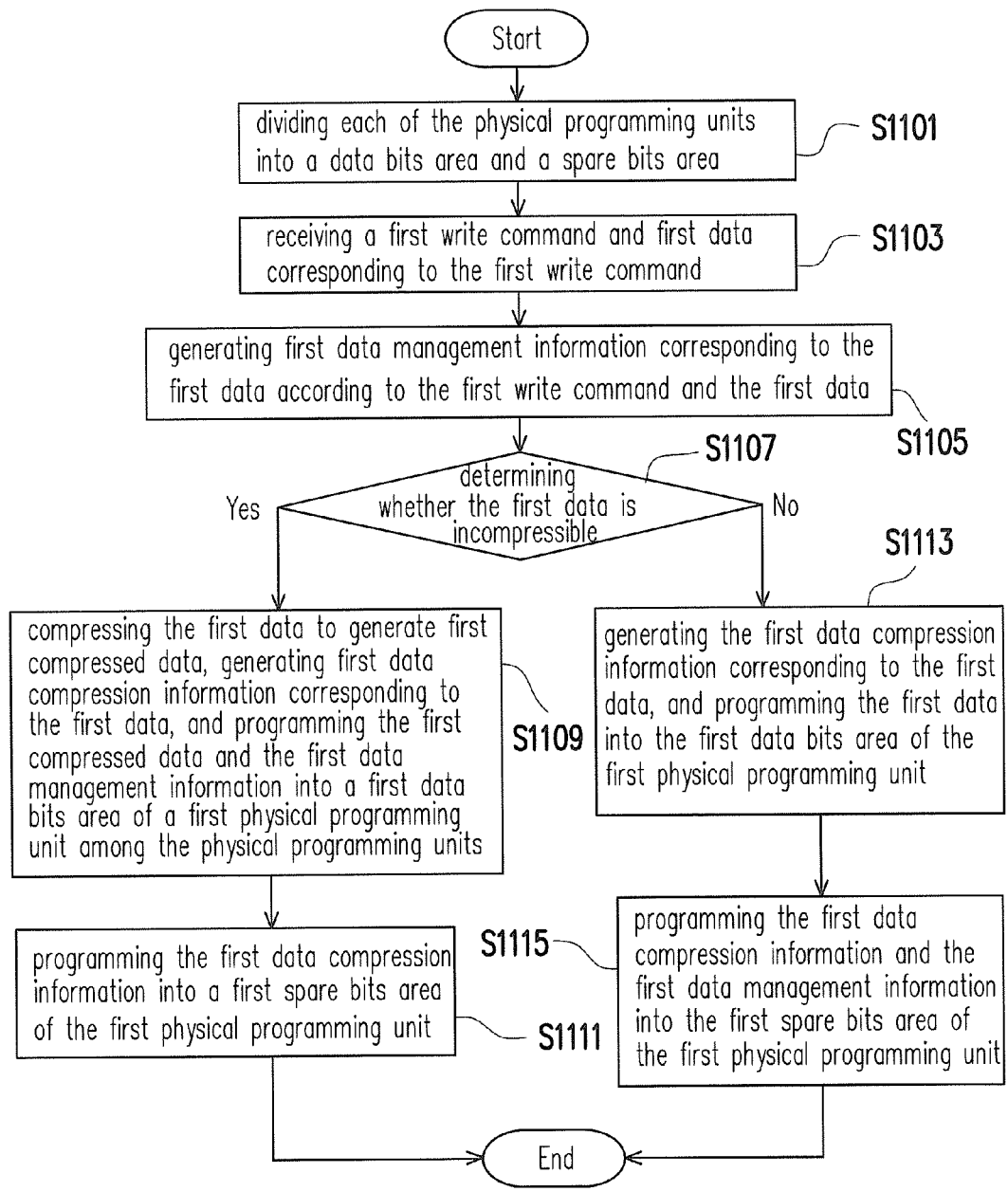
FIG. 11 is a flowchart illustrating a data management method according to first exemplary embodiment of the invention.

FIG. 11 is a flowchart illustrating a data management method according to first exemplary embodiment of the present invention.

Referring to FIG. 11, in step S1101, the memory control circuit unit 104 (or the memory management circuit 202) divides each of the physical programming units into a data bits area and a spare bits area. In step S1103, the memory control circuit unit 104 (or the memory management circuit 202) receives a first write command and first data corresponding to the first write command. Next, in step S1105, the memory control circuit unit 104 (or the memory management circuit 202) generates first data management information corresponding to the first data according to the first write command and the first data. Thereafter, in step S1107, the memory control circuit unit 104 (or the memory management circuit 202) determines whether the first data is incompressible.

If the memory control circuit unit 104 (or the memory management circuit 202) determines that the first data is incompressible in step S1107, in step S1109, the memory control circuit unit 104 (or the memory management circuit 202) instructs the data compressing/decompressing circuit to compress the first data to generate first compressed data, and the memory control circuit unit 104 (or the memory management circuit 202) generates first data compression information corresponding to the first data and programs the first compressed data and the first data management information into a first data bits area of a first physical programming unit among the physical programming units. Subsequently, in step S1111, the memory control circuit unit 104 (or the memory management circuit 202) programs the first data compression information into a first spare bits area of the first physical programming unit, so as to complete the entire process of the data management method.

If the memory control circuit unit 104 (or the memory management circuit 202) determines that the first data is incompressible in step S1107, in step S1113, the memory control circuit unit 104 (or the memory management circuit 202) generates the first data compression information corresponding to the first data, and programs the first data into the first data bits area of the first physical programming unit. Subsequently, in step S1115, the memory control circuit unit 104 (or the memory management circuit 202) programs the first data compression information and the first data management information into the first spare bits area of the first physical programming unit, so as to complete the entire process of the data management method.

Second Exemplary Embodiment

In the second exemplary embodiment, as compared to those in the first exemplary embodiment, hardware structures are similar yet the data management methods used are different. Differences between the second exemplary embodiment and the first exemplary embodiment are described as follows.

FIGS. 12A to 12F are schematic diagrams for storing the compressed data into the physical programming unit according to an exemplary embodiment of the invention.

Referring to FIG. 12A, for instance, the memory control circuit unit 104 (or the memory management circuit 202) receives the compressible first data RD1 having the size of 4096 bytes, and, as for the first data RD1, the memory control circuit unit 104 (or the memory management circuit 202) instructs the error checking and correcting circuit 212 to generate the first error checking and correcting code. Next, the memory control circuit unit 104 (or the memory management circuit 202) compresses the first data RD1 into the first transition data TD1. Herein, the size of the first transition data TD1 is 2000 bytes, which is greater than the first preset compression length and less than the second preset compression length. After the first data RD1 is compressed, one first data compression information is generated (not illustrated), wherein the first data compression information records information indicating that the first data RD1 is compressed, and also records the compression rate for compressing the first data RD1 into the first transition data TD1.

Referring to FIG. 12B, unlike the first exemplary embodiment, because the size of the first transition data TD1 is greater than the first preset compression length and less than the second preset compression length, as in correspondence to the size of the second preset compression length, the memory control circuit unit 104 (or the memory management circuit 202) divides the first data bits area DBA1 from the data bits area DBA of the first physical programming unit, and divides the first data bits area DBA1 into a first user data area UDA1 and a first management information area MIA1 so that the size of the first user data area UDA1 is equal to the second preset compression length, wherein the size of the first management information area MIA1 is 8 bytes. It is worth mentioning that, the size of the first management information area MIA1 may be set based on demands, which is not particularly limited in the invention.

Figures 12C, 12D:
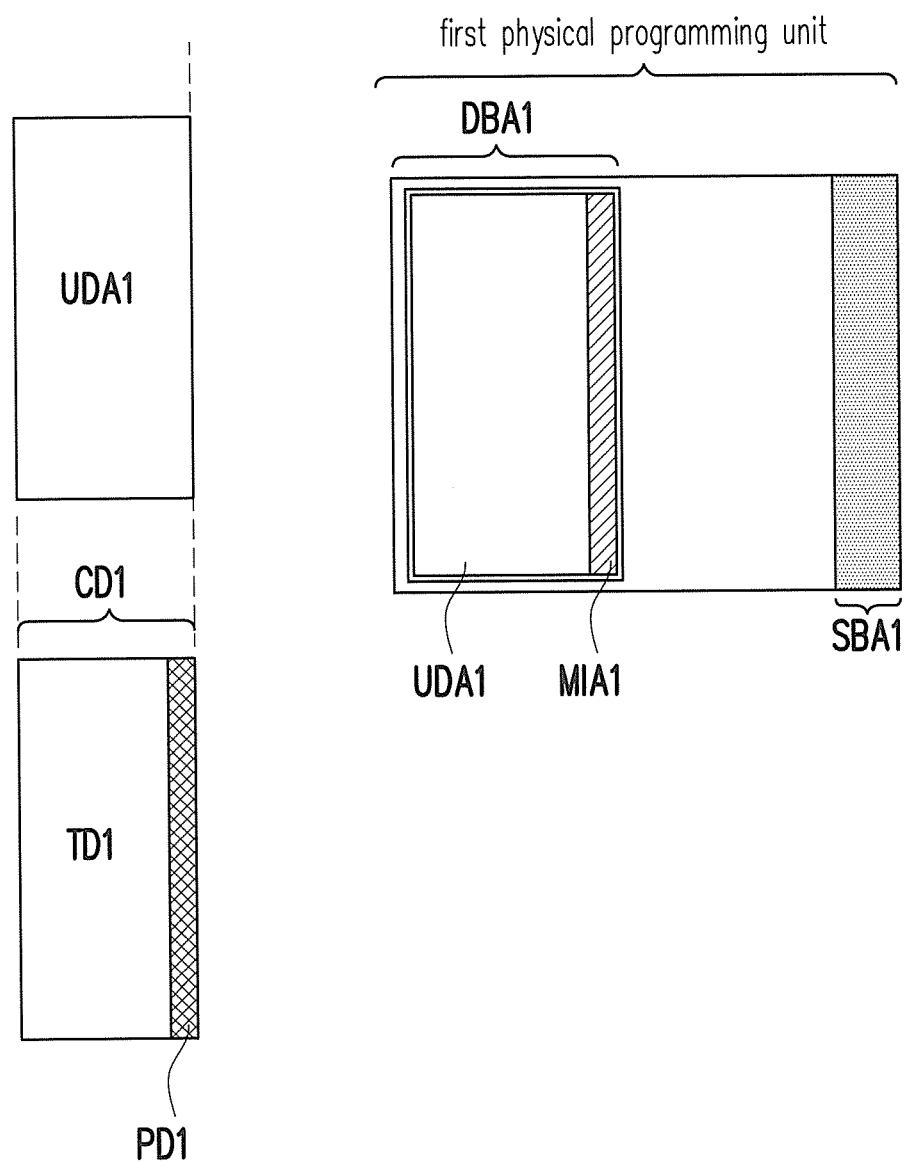

Referring to FIG. 12C and FIG. 12D, because the size of the first transition data TD1 is less than the first user data area UDA1, the memory control circuit unit 104 (or the memory management circuit 202) adds the first padding data PD1 after the first transition data TD1 as the first compressed data CD1 so that the size of the first compressed data CD1 is equal to the size of the first user data area UDA1. Meanwhile, the memory control circuit unit 104 (or the memory management circuit 202) records the size and an address of the first padding data PD1 into the first data compression information.

Figures 12E, 12F:
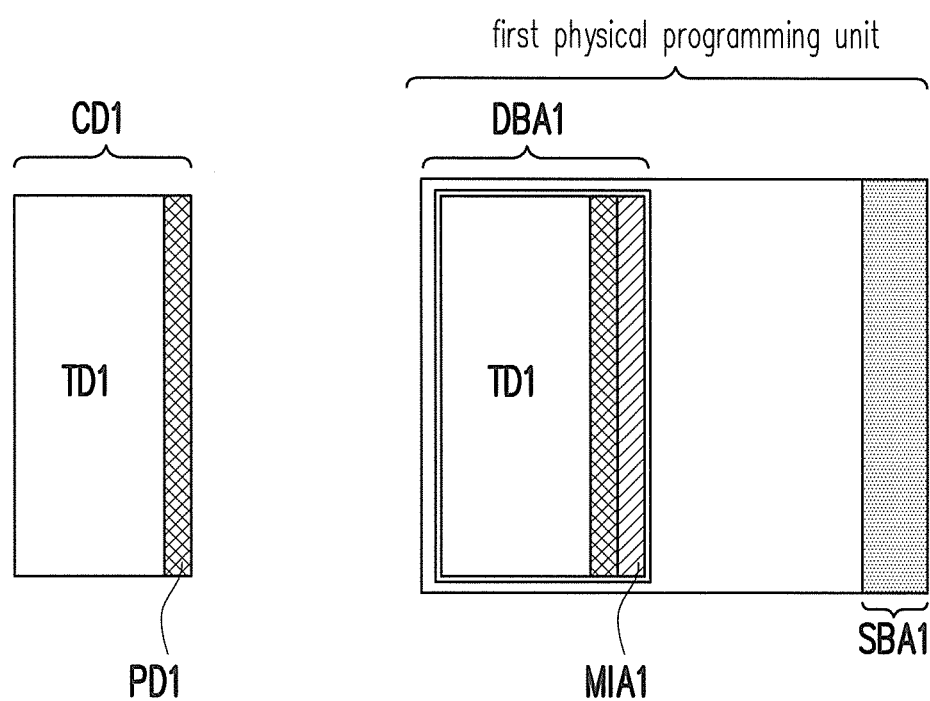

Referring to FIG. 12E and FIG. 12F, the first compressed data CD1 generated by the memory control circuit unit 104 (or the memory management circuit 202) is stored into the first user data area UDA1, and the first data management information DMI1 (e.g., the first error checking and correcting code or the addresses of the logical sub-unit corresponding to the first data) corresponding to the first data RD1 is stored into the first management information area MIA1. Subsequently, the memory control circuit unit 104 (or the memory management circuit 202) may store the first data compression information corresponding to the first data RD1 into the first spare bits area SBA1.

Figure 13:
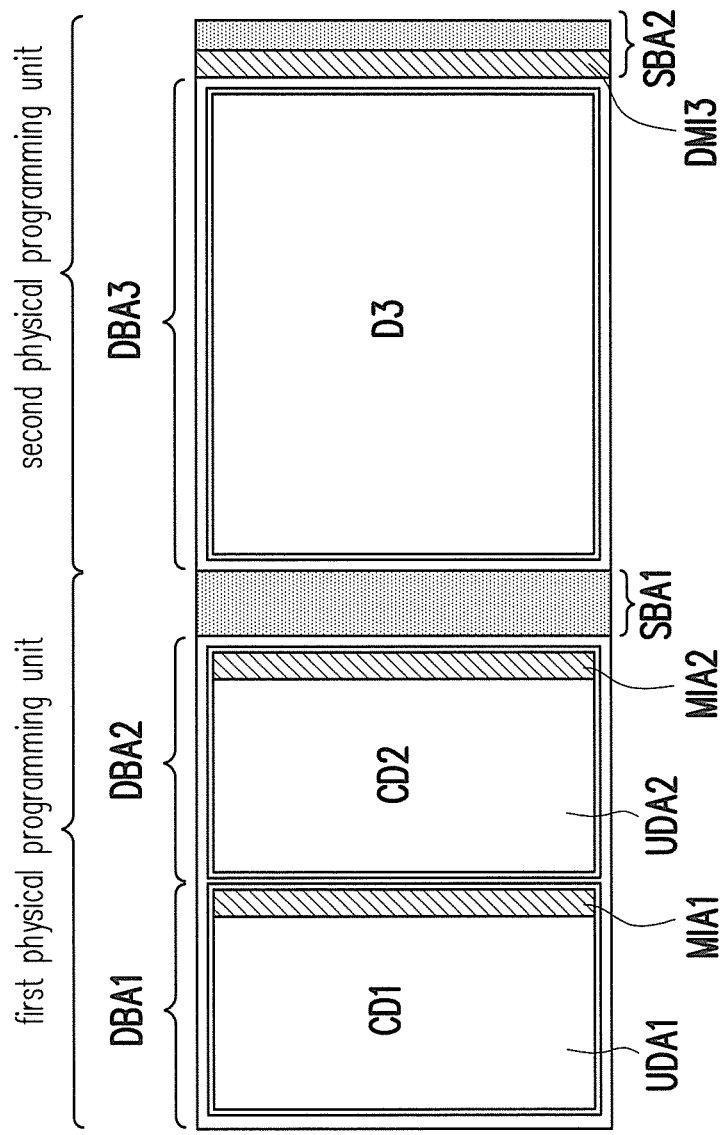
FIG. 13 is a schematic diagrams for storing the non-compressed data into the physical programming unit according to an exemplary embodiment of the invention.

FIG. 13 is a schematic diagrams for storing the non-compressed data into the physical programming unit according to an exemplary embodiment of the present invention.

Referring to FIG. 13, assuming that the memory control circuit unit 104 (or the memory management circuit 202) receives the incompressible third data D3 having the size of 4096 bytes when the first compressed data CD1 and the second compressed data CD2 are already stored in the first physical programming unit, wherein the third data D3 is incompressible data having the size of 4096 bytes, and the first physical programming unit does not have the space for storing the third data D3. Because the second physical programming unit arranged behind the first physical programming unit has the blank data bits area having the size of 4096 bytes, the memory control circuit unit 104 (or the memory management circuit 202) may divide the third data bits area DBA3 having the size of 4096 bytes from the data bits area of the second physical programming unit, store the third data D3 entirely into the third data bits area DBA3 of the second physical programming unit, and store the third data management information DMI3 corresponding to the third data D3 and the third data compression information into the second spare bits area SBA2 of the second physical programming unit.

Figure 14:
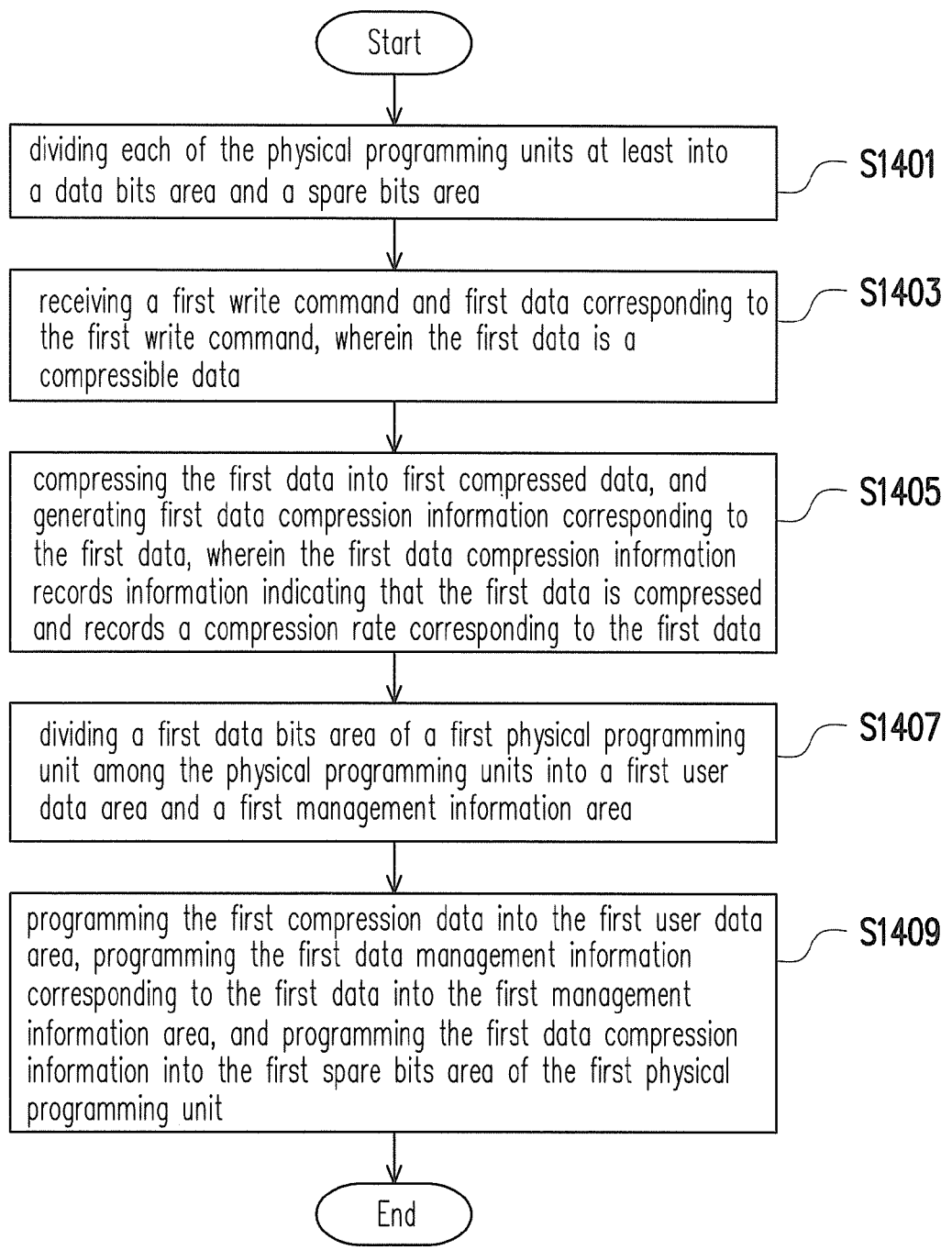
FIG. 14 is a flowchart illustrating a data management method according to second exemplary embodiment of the invention.

FIG. 14 is a flowchart illustrating a data management method according to second exemplary embodiment of the present invention.

Referring to FIG. 14, in step S1401, the memory control circuit unit 104 (or the memory management circuit 202) at least divides each of the physical programming units into a data bits area and a spare bits area. Next, in step S1403, the memory control circuit unit 104 (or the memory management circuit 202) receives a first write command and first data corresponding to the first write command, wherein the first data is compressible data. Thereafter, in step S1405, the memory control circuit unit 104 (or the memory management circuit 202) instructs the data compressing/decompressing circuit to compress the first data into first compressed data, and generate first data compression information corresponding to the first data, wherein the first data compression information records information indicating that the first data is compressed and records a compression rate corresponding to the first data. Next, in step S1407, the memory control circuit unit 104 (or the memory management circuit 202) divides a first data bits area of a first physical programming unit among the physical programming units into a first user data area and a first management information area. Subsequently, in step S1409, the memory control circuit unit 104 (or the memory management circuit 202) programs the first compression data into the first user data area, programs the first data management information corresponding to the first data into the first management information area, and programs the first data compression information into the first spare bits area of the first physical programming unit, so as to complete the entire process of the data management method.

It should be noted that, the data management information/the information stored in the data management area or the spare bits area are served only illustrative instead of limitation to the invention.

In summary, the exemplary embodiments of the invention are capable of storing the data management information corresponding to the compressed data and the corresponding compressed data together into the data bits area without occupying a space of the spare bits area. Accordingly, when a plurality of compressed data is stored into one physical programming unit, the spare bits area of that physical programming unit can still reserve spaces for storing other information. As a result, the use efficiency of the space in the memory storage apparatus may be improved and the related information for compressing data may also be effectively managed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data management method for a rewritable non-volatile memory module, wherein the rewritable non-volatile memory module comprises a plurality of physical erasing units and a plurality of logical units for mapping to at least a part of the physical erasing units, and each of the physical erasing units comprises a plurality of physical programming units, and the data management method comprises:

dividing each of the physical programming units into a data bits area and a spare bits area;

receiving a first write command and first data corresponding to the first write command;

generating first data management information corresponding to the first data according to the first write command and the first data;

determining whether the first data is compressible, and generating first data compression information corresponding to the first data according to a determination result;

if the first data is compressible, compressing the first data to generate first compressed data, programming the first compressed data and the first data management information corresponding to the first data into a first data bits area of a first physical programming unit among the physical programming units, and programming the first data compression information into a first spare bits area of the first physical programming unit; and if the first data is incompressible, programming the first data into the first data bits area of the first physical programming unit, and programming the first data compression information and the first data management information into the first spare bits area of the first physical programming unit.

2. The data management method of claim 1, wherein the first write command instructs to store the first data into a first logical sub-unit, and the step of generating the first data management information corresponding to the first data according to the first write command and the first data comprises:

integrating a first data error checking and correcting code generated corresponding to the first data into the first data management information; and integrating an address of the first logical sub-unit corresponding to the first data into the first data management information.

3. The data management method of claim 1, wherein the step of generating the first data compression information corresponding to the first data comprises:

integrating information indicating whether the first data is compressed into the first data compression information; and if the first data is compressible, integrating a compression rate corresponding to the first data into the first data compression information.

4. The data management method of claim 1, further comprising:

if the first data is compressible, compressing the first data into first transition data;

determining the size of the first transition data;

if the size of the first transition data is less than or equal to a first preset compression length, adding first padding data to the first transition data as the first compressed data so that the size of the first compressed data is equal to the first preset compression length, and grouping the first compressed data and the first data management information into a first error checking and correcting frame, wherein the size of the first error checking and correcting frame is equal to a first error checking and correcting frame length;

if the size of the first transition data is greater than the first preset compression length and less than a second preset compression length, adding second padding data to the first transition data as the first compressed data so that the size of the first compressed data is equal to the second preset compression length, and grouping the first compressed data and the first data management information into the first error checking and correcting frame, wherein the size of the first error checking and correcting frame is equal to a second error checking and correcting frame length;

if the size of the first transition data is greater than the second preset compression length and less than a third preset compression length, adding third padding data to the first transition data as the first compressed data so that the size of the first compressed data is equal to the third preset compression length, and grouping the first compressed data and the first data management information into the first error checking and correcting frame, wherein the size of the first error checking and correcting frame is equal to a third error checking and correcting frame length; and if the size of the first transition data is greater than the third preset compression length and less than a fourth preset compression length, adding fourth padding data to the first transition data as the first compressed data so that the size of the first compressed data is equal to the fourth preset compression length, and grouping the first compressed data and the first data management information into the first error checking and correcting frame, wherein the size of the first error checking and correcting frame is equal to a fourth error checking and correcting frame length; and programming the first error checking and correcting frame into the first data bits area.

5. The data management method of claim 4, wherein
the size of the first logical sub-unit and the size of the first physical programming unit are the size of a transmission unit, wherein the size of the transmission unit is 4096 bytes;
the size of the first error checking and correcting frame length is one quarter the size of the first physical programming unit;
the size of the second error checking and correcting frame length is one half the size of the first physical programming unit;
the size of the third error checking and correcting frame length is three quarters the size of the first physical programming unit;
the size of the fourth error checking and correcting frame length is the size of the first physical programming unit.

6. The data management method of claim 4, further comprising:
integrating information regarding addresses and sizes of the first padding data, the second padding data, the third padding data or the fourth padding data corresponding to the first transition data into the first data management information.

7. A data management method for a rewritable non-volatile memory module, wherein the rewritable non-volatile memory module comprises a plurality of physical erasing units, and a plurality of logical units for mapping to at least a part of the physical erasing units, wherein each of the physical erasing units comprises a plurality of physical programming units, and the data management method comprises:
dividing each of the physical programming units at least into a data bits area and a spare bits area;
receiving first data, wherein the first data is compressible data;
compressing the first data into first compressed data, and generating first data compression information corresponding to the first data, wherein information indicating whether the first data is compressed and a compression rate corresponding to the first data are integrated into the first data compression information;
dividing a first data bits area of a first physical programming unit among the physical programming units into a first user data area and a first management information area;
programming the first compressed data into the first user data area, programming first data management information corresponding to the first data into the first management information area, and programming the first data compression information into a first spare bits area of the first physical programming unit.

8. The data management method of claim 7, further comprising:
receiving second data, wherein the second data is incompressible data; and
programming the second data into a data bits area of a second physical programming unit among the physical programming units, and programming second data management information and second data compression information corresponding to the second data into a spare bits area of the second physical programming unit, wherein information indicating that the second data is the incompressible data is integrated into the second data compression information.

9. A memory control circuit unit, for controlling a rewritable non-volatile memory module, and the memory control circuit unit comprising:
a host interface configured to couple to a host system;
a memory interface configured to couple to the rewritable non-volatile memory module, wherein the rewritable non-volatile memory module comprises a plurality of physical erasing units, and each of the physical erasing units comprises a plurality of physical programming units;
a memory management circuit, coupled to the host interface and the memory interface, wherein the memory management circuit is configured to configure a plurality of logical units for mapping to at least a part of the physical erasing units; and
a data compressing/decompressing circuit, coupled to the memory management circuit, and configured to perform a compressing operation or a decompressing operation on data,
wherein the memory management circuit is further configured to divide each of the physical programming units into a data bits area and a spare bits area,
wherein the memory management circuit is further configured to receive a first write command and first data corresponding to the first write command,
wherein the memory management circuit is further configured to generate first data management information corresponding to the first data according to the first write command and the first data,
wherein the memory management circuit is further configured to determine whether the first data is compressible, and generate first data compression information corresponding to the first data according to a determination result,
wherein if the first data is compressible, the memory management circuit is further configured to instruct the data compressing/decompressing circuit to compress the first data to generate first compressed data, the memory management circuit is further configured to issue a command sequence to the rewritable non-volatile memory module in order to program the first compressed data and the first data management information corresponding to the first data into a first data bits area of a first physical programming unit among the physical programming units, and program the first data compression information into a first spare bits area of the first physical programming unit,
wherein if the first data is incompressible, the memory management circuit is further configured to issue a command sequence to the rewritable non-volatile memory module in order to program the first data into the first data bits area of the first physical programming unit, and program the first data compression information and the first data management information into the first spare bits area of the first physical programming unit.

10. The memory control circuit unit of claim 9, wherein the first write command instructs to store the first data into a first logical sub-unit, and in the operation of generating the first data management information corresponding to the first data according to the first write command and the first data, the memory management circuit is further configured to integrate a first data error checking and correcting code generated corresponding to the first data into the first data management information,
  wherein the memory management circuit is further configured to integrate an address of the first logical sub-unit corresponding to the first data into the first data management information.

11. The memory control circuit unit of claim 9, wherein in the operation of generating the first data compression information corresponding to the first data, the memory management circuit is further configured to integrate information indicating whether the first data is compressed into the first data compression information,
  wherein if the first data is compressible, the memory management circuit is further configured to integrate a compression rate corresponding to the first data into the first data compression information.

12. The memory control circuit unit of claim 9, wherein
  if the first data is compressible, the data compressing/decompressing circuit compresses the first data into first transition data,
  wherein the memory management circuit is further configured to determine the size of the first transition data,
  wherein if the size of the first transition data is less than or equal to a first preset compression length, the memory management circuit is further configured to add first padding data to the first transition data as the first compressed data so that the size of the first compressed data is equal to the first preset compression length, and group the first compressed data and the first data management information into a first error checking and correcting frame, wherein the size of the first error checking and correcting frame is equal to a first error checking and correcting frame length,
  wherein if the size of the first transition data is greater than the first preset compression length and less than a second preset compression length, the memory management circuit is further configured to add second padding data to the first transition data as the first compressed data so that the size of the first compressed data is equal to the second preset compression length, and group the first compressed data and the first data management information into the first error checking and correcting frame, wherein the size of the first error checking and correcting frame is equal to a second error checking and correcting frame length,
  wherein if the size of the first transition data is greater than the second preset compression length and less than a third preset compression length, the memory management circuit is further configured to add third padding data to the first transition data as the first compressed data so that the size of the first compressed data is equal to the third preset compression length, and group the first compressed data and the first data management information into the first error checking and correcting frame, wherein the size of the first error checking and correcting frame is equal to a third error checking and correcting frame length,
  wherein if the size of the first transition data is greater than the third preset compression length and less than a fourth preset compression length, the memory management circuit is further configured to add fourth padding data to the first transition data as the first compressed data so that the size of the first compressed data is equal to the fourth preset compression length, and group the first compressed data and the first data management information into the first error checking and correcting frame, wherein the size of the first error checking and correcting frame is equal to a fourth error checking and correcting frame length,
  wherein the memory management circuit is further configured to issue a command sequence to the rewritable non-volatile memory module in order to program the first error checking and correcting frame into the first data bits area.

13. The memory control circuit unit of claim 12, wherein
  the size of the first logical sub-unit and the size of the first physical programming unit are a transmission unit size, wherein the transmission unit size is 4096 bytes;
  the size of the first error checking and correcting frame length is one quarter the size of the first physical programming unit;
  the size of the second error checking and correcting frame length is one half the size of the first physical programming unit;
  the size of the third error checking and correcting frame length is three quarters the size of the first physical programming unit;
  the size of the fourth error checking and correcting frame length is the size of the first physical programming unit.

14. The memory control circuit unit of claim 12, wherein the memory management circuit is further configured to integrate information regarding addresses and sizes of the first padding data, the second padding data, the third padding data or the fourth padding data corresponding to the first transition data into the first data management information.

15. A memory control circuit unit, configured to control a rewritable non-volatile memory module, and the memory control circuit unit comprising:
  a host interface configured to couple to a host system;
  a memory interface configured to couple to the rewritable non-volatile memory module, wherein the rewritable non-volatile memory module comprises a plurality of physical erasing units and each of the physical erasing units comprises a plurality of physical programming units;
  a memory management circuit, coupled to the host interface and the memory interface, wherein the memory management circuit is configured to configure a plurality of logical units for mapping to at least a part of the physical erasing units; and
  a data compressing/decompressing circuit, coupled to the memory management circuit, and configured to perform a compressing operation or a decompressing operation on data,
  wherein the memory management circuit is further configured to divide each of the physical programming units at least into a data bits area and a spare bits area,
  wherein the memory management circuit is configured to receive first data, wherein the first data is compressible data,
  wherein the memory management circuit is configured to instruct the data compressing/decompressing circuit to compress the first data into first compressed data, and the memory management circuit generates first data compression information corresponding to the first data, wherein information indicating whether the first data is compressed and a compression rate corresponding to the first data are integrated into the first data compression information by the memory management circuit, wherein the memory management circuit is configured to divide a first data bits area of a first physical programming unit among the physical programming units into a first user data area and a first management information area, wherein the memory management circuit is configured to issue a command sequence to the rewritable non-volatile memory module in order to program the first compressed data into the first user data area, program first data management information corresponding to the first data into the first management information area, and program the first data compression information into the first spare bits area of the first physical programming unit.

16. The memory control circuit unit of claim 15, wherein the memory management circuit is further configured to receive second data, wherein the second data is incompressible data, wherein the memory management circuit is configured to issue a command to the rewritable non-volatile memory module in order to program the second data into a second data bits area of a second physical programming unit among the physical programming units, and program second data management information and second data compression information corresponding to the second data into a spare bits area of the second physical programming unit, wherein information indicating that the second data is the incompressible data is integrated into the second data compression information by the memory management circuit.

17. A memory storage apparatus, comprising:

a connection interface unit configured to couple to a host system;

a rewritable non-volatile memory module, wherein the rewritable non-volatile memory module comprises a plurality of physical erasing units and each of the physical erasing units comprises a plurality of physical programming units; and a memory control circuit unit, coupled to the connection interface unit and the rewritable non-volatile memory module, wherein the memory control circuit is configured to configure a plurality of logical units for mapping to at least a part of the physical erasing units, wherein the memory control circuit unit is further configured to divide each of the physical programming units into a data bits area and a spare bits area, wherein the memory control circuit unit is further configured to receive a first write command and first data corresponding to the first write command, wherein the memory control circuit unit is further configured to generate first data management information corresponding to the first data according to the first write command and the first data, wherein the memory control circuit unit is further configured to determine whether the first data is compressible, and generate first data compression information corresponding to the first data according to a determination result, wherein if the first data is compressible, the memory control circuit unit is further configured to compress the first data to generate first compressed data, program the first compressed data and the first data management information corresponding to the first data into a first data bits area of a first physical programming unit among the physical programming units, and program the first data compression information into a first spare bits area of the first physical programming unit, wherein if the first data is incompressible, the memory control circuit unit is further configured to program the first data into the first data bits area of the first physical programming unit, and program the first data compression information and the first data management information into the first spare bits area of the first physical programming unit.

18. The memory storage apparatus of claim 17, wherein the first write command instructs to store the first data into a first logical sub-unit, and in the operation of generating the first data management information corresponding to the first data according to the first write command and the first data, the memory control circuit unit is further configured to integrate a first data error checking and correcting code generated corresponding to the first data into the first data management information, wherein the memory control circuit unit is further configured to integrate an address of the first logical sub-unit corresponding to the first data into the first data management information.

19. The memory storage apparatus of claim 17, wherein in the operation of generating the first data compression information corresponding to the first data, the memory control circuit unit is further configured to integrate information indicating whether the first data is compressed into the first data compression information, wherein if the first data is compressible, the memory control circuit unit is further configured to integrate a compression rate corresponding to the first data into the first data compression information.

20. The memory storage apparatus of claim 17, wherein if the first data is compressible, the memory control circuit unit compresses the first data into first transition data, wherein the memory control circuit unit is further configured to determine the size of the first transition data, wherein if the size of the first transition data is less than or equal to a first preset compression length, the memory control circuit unit is further configured to add first padding data to the first transition data as the first compressed data so that the size of the first compressed data is equal to the first preset compression length, and group the first compressed data and the first data management information into a first error checking and correcting frame, wherein the size of the first error checking and correcting frame is equal to a first error checking and correcting frame length, wherein if the size of the first transition data is greater than the first preset compression length and less than a second preset compression length, the memory control circuit unit is further configured to add second padding data to the first transition data as the first compressed data so that the size of the first compressed data is equal to the second preset compression length, and group the first compressed data and the first data management information into the first error checking and correcting frame, wherein the size of the first error checking and correcting frame is equal to a second error checking and correcting frame length, wherein if the size of the first transition data is greater than the second preset compression length and less than a third preset compression length, the memory control circuit unit is further configured to add third padding data to the first transition data as the first compressed data so that the size of the first compressed data is equal to the third preset compression length, and group the first compressed data and the first data management information into the first error checking and correcting frame, wherein the size of the first error checking and correcting frame is equal to a third error checking and correcting frame length, wherein if the size of the first transition data is greater than the third preset compression length and less than a fourth preset compression length, the memory control circuit unit is further configured to add fourth padding data to the first transition data as the first compressed data so that the size of the first compressed data is equal to the fourth preset compression length, and group the first compressed data and the first data management information into the first error checking and correcting frame, wherein the size of the first error checking and correcting frame is equal to a fourth error checking and correcting frame length, wherein the memory control circuit unit is further configured to program the first error checking and correcting frame into the first data bits area.

21. The memory storage apparatus of claim 20, wherein the size of the first logical sub-unit and the size of the first physical programming unit are the size of a transmission unit, wherein the size of the transmission unit is 4096 bytes;

the size of the first error checking and correcting frame length is one quarter the size of the first physical programming unit;

the size of the second error checking and correcting frame length is one half the size of the first physical programming unit;

the size of the third error checking and correcting frame length is three quarters the size of the first physical programming unit;

the size of the fourth error checking and correcting frame length is the size of the first physical programming unit.

22. The memory storage apparatus of claim 20, wherein the memory control circuit unit is further configured to integrate information regarding addresses and sizes of the first padding data, the second padding data, the third padding data or the fourth padding data corresponding to the first transition data into the first data management information.

23. A memory storage apparatus, comprising:

a connection interface unit configured to couple to a host system;

a rewritable non-volatile memory module, wherein the rewritable non-volatile memory module comprises a plurality of physical erasing units, and each of the physical erasing units comprises a plurality of physical programming units; and a memory control circuit unit, coupled to the connection interface unit and the rewritable non-volatile memory module, wherein the memory control circuit unit is configured to configure a plurality of logical units for mapping to at least a part of the physical erasing units, wherein the memory control circuit unit is further configured to divide each of the physical programming units into a data bits area and a spare bits area, wherein the memory control circuit unit is configured to receive first data, wherein the first data is compressible data, wherein the memory control circuit unit is further configured to compress the first data into first compressed data, and the memory control circuit unit generates first data compression information corresponding to the first data, wherein information indicating whether the first data is compressed and a compression rate corresponding to the first data are integrated into the first data compression information by the memory control circuit unit, wherein the memory control circuit unit is configured to divide a first data bits area of a first physical programming unit among the physical programming units into a first user data area and a first management information area, wherein the memory control circuit unit is further configured to program the first compressed data into the first user data area, program first data management information corresponding to the first data into the first management information area, and program the first data compression information into the first spare bits area of the first physical programming unit.

24. The memory storage apparatus of claim 23, wherein the memory control circuit unit is further configured to receive second data, wherein the second data is incompressible data, wherein the memory control circuit unit is further configured to program the second data into a second data bits area of a second physical programming unit among the physical programming units, and program second data management information and second data compression information corresponding to the second data into a spare bits area of the second physical programming unit, wherein information indicating that the second data is the incompressible data is integrated into the second data compression information by the memory control circuit unit.

* * * * *